(12) United States Patent
Saki et al.

(10) Patent No.: US 11,664,044 B2
(45) Date of Patent: May 30, 2023

(54) SOUND EVENT DETECTION LEARNING

(71) Applicant: QUALCOMM Incorporated, San Diego, CA (US)

(72) Inventors: Fatemeh Saki, San Diego, CA (US); Yinyi Guo, San Diego, CA (US); Erik Visser, San Diego, CA (US); Eunjeong Koh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 227 days.

(21) Appl. No.: 17/102,797

(22) Filed: Nov. 24, 2020

(65) Prior Publication Data

US 2021/0158837 A1 May 27, 2021

Related U.S. Application Data

(60) Provisional application No. 62/939,801, filed on Nov. 25, 2019.

(51) Int. Cl.
*G10L 25/78* (2013.01)
*G10L 25/30* (2013.01)
(Continued)

(52) U.S. Cl.
CPC .......... *G10L 25/78* (2013.01); *B60R 11/0247* (2013.01); *G06N 3/045* (2023.01);
(Continued)

(58) Field of Classification Search
CPC .......... G10L 25/78; G10L 25/51; G10L 25/24; G10L 25/30; B60R 11/0247;
(Continued)

(56) References Cited

U.S. PATENT DOCUMENTS 4,827,521 A 5/1989 Bahl et al.
8,463,648 B1 6/2013 Bierner et al.
(Continued)

OTHER PUBLICATIONS

Arora et al. "A Study on Transfer Learning for Acoustic Event Detection in a Real Life Scenario", IEEE, Nov. 30, 2017 (Year: 2017).*

(Continued)

*Primary Examiner* — Yogeshkumar Patel
(74) *Attorney, Agent, or Firm* — Moore IP

(57) ABSTRACT

A device includes a processor configured to receive audio data samples and provide the audio data samples to a first neural network to generate a first output corresponding to a first set of sound classes. The processor is further configured to provide the audio data samples to a second neural network to generate a second output corresponding to a second set of sound classes. A second count of classes of the second set of sound classes is greater than a first count of classes of the first set of sound classes. The processor is also configured to provide the first output to a neural adapter to generate a third output corresponding to the second set of sound classes. The processor is further configured to provide the second output and the third output to a merger adapter to generate sound event identification data based on the audio data samples.

30 Claims, 11 Drawing Sheets

(51) Int. Cl.

| | | |
|---|---|---|
| *G10L 25/24* | (2013.01) | |
| *H04R 5/033* | (2006.01) | |
| *B60R 11/02* | (2006.01) | |
| *G06N 3/084* | (2023.01) | |
| *G06N 3/045* | (2023.01) | |

(52) U.S. Cl.
CPC .............. *G06N 3/084* (2013.01); *G10L 25/24* (2013.01); *G10L 25/30* (2013.01); *H04R 5/033* (2013.01); *H04R 2499/13* (2013.01)

(58) Field of Classification Search
CPC ........ G06N 3/0454; G06N 3/084; G06N 3/08; G06N 3/0481; H04R 5/033; H04R 2499/13; H04R 2460/01; H04R 2499/11; H04R 2499/15; H04R 3/005
See application file for complete search history.

(56) References Cited

U.S. PATENT DOCUMENTS

| | | |
|---|---|---|
| 9,165,556 B1 | 10/2015 | Sugar et al. |
| 9,412,361 B1 | 8/2016 | Geramifard et al. |
| 9,812,152 B2 | 11/2017 | Christian et al. |
| 10,026,401 B1 | 7/2018 | Mutagi et al. |
| 2003/0028384 A1 | 2/2003 | Kemp et al. |
| 2005/0187770 A1 | 8/2005 | Kompe et al. |
| 2007/0033005 A1 | 2/2007 | Cristo et al. |
| 2007/0043574 A1 | 2/2007 | Coffman et al. |
| 2007/0050191 A1 | 3/2007 | Weider et al. |
| 2007/0183604 A1 | 8/2007 | Araki et al. |
| 2009/0106022 A1 | 4/2009 | Madani |
| 2011/0166856 A1 | 7/2011 | Lindahl et al. |
| 2011/0173539 A1 | 7/2011 | Rottler et al. |
| 2012/0089396 A1 | 4/2012 | Patel et al. |
| 2014/0074466 A1 | 3/2014 | Sharifi et al. |
| 2014/0161270 A1 | 6/2014 | Peters et al. |
| 2015/0066479 A1 | 3/2015 | Pasupalak et al. |
| 2015/0213119 A1 | 7/2015 | Agarwal et al. |
| 2016/0012020 A1 | 1/2016 | George et al. |
| 2016/0176309 A1 | 6/2016 | Jeon et al. |
| 2016/0225389 A1 | 8/2016 | Jinnai et al. |
| 2016/0259775 A1 | 9/2016 | Gelfenbeyn et al. |
| 2017/0076727 A1 | 3/2017 | Ding et al. |
| 2017/0116986 A1 | 4/2017 | Weng et al. |
| 2017/0124818 A1 | 5/2017 | Ullrich et al. |
| 2017/0154176 A1 | 6/2017 | Yun et al. |
| 2017/0270919 A1 | 9/2017 | Parthasarathi et al. |
| 2017/0278514 A1 | 9/2017 | Mathias et al. |
| 2017/0323643 A1 | 11/2017 | Arslan et al. |
| 2018/0108369 A1* | 4/2018 | Gross .................. B60R 25/1009 |
| 2018/0121034 A1 | 5/2018 | Baker et al. |
| 2018/0144615 A1 | 5/2018 | Kinney et al. |
| 2018/0150897 A1 | 5/2018 | Wang et al. |
| 2019/0042881 A1* | 2/2019 | Lopatka ............... G06K 9/6223 |
| 2019/0050875 A1 | 2/2019 | McCord |
| 2019/0066693 A1 | 2/2019 | Ziv et al. |
| 2019/0130910 A1 | 5/2019 | Kariya et al. |
| 2019/0171409 A1 | 6/2019 | Boulanger et al. |
| 2019/0205395 A1 | 7/2019 | Bonin et al. |

OTHER PUBLICATIONS

Lim et al. "Cross-acoustic transfer learning for sound event classification", IEEE, May 19, 2016 (Year: 2016).*

Barchiesi D., et al., "Acoustic Scene Classification", IEEE Signal Processing Magazine, May 2015, vol. 32, No. 3, pp. 16-34.

Kingma D.P., et al., "ADAM: A Method for Stochastic Optimization", arXiv:1412.6980v9 [cs.LG], Jan. 30, 2017, International Conference for Learning Representations, 2015, pp. 1-15.

Krsmanovic F., et al., "Have we met? MDP Based Speaker ID for Robot Dialogue", Proceedings of Interspeech 2006, Sep. 17, 2006, XP055117559, table 3, section 2, 4 pages.

Salamon J., et al., "Deep Convolutional Neural Networks and Data Augmentation for Environmental Sound Classification", arXiv:1608.04363v2 [cs.SD], IEEE Signal Processing Letters, Accepted, Nov. 28, 2016, 5 pages.

Tax D.M.J., et al., "Support Vector Domain Description", Pattern Recognition Letters 20, Elsevier, 1999, pp. 1191-1199.

Yang E., et al., "Mitigating User Frustration through Adaptive Feedback Based on Human Automation Etiquette Strategies", Industrial Engineering, Iowa State University, 2016, 195 Pages.

Arora P., et al., "A study on Transfer Learning for Acoustic Event Detection in a Real Life Scenaro", 2017 IEEE 19th International Workshop on Multimedia Signal Processing (MMSP), IEEE, Oct. 16, 2017 (Oct. 16, 2017), pp. 1-6, XP033271590, DOI: 10.1109/MMSP.2017.8122258, [retrieved on Nov. 27, 2017], Figure 1 Section I. Introduction, first paragraph, last sentence p. 3, left-hand column, second paragraph Section III. A. Databases section III. B. Setup and evaluation metrics section III. C. Neural Network configurations section III. D.

International Search Report and Written Opinion—PCT/US2020/062218—ISA/EPO—dated Mar. 9, 2021.

Koh E., et al., "Incremental Learning Algorithm for Sound Event Detection", 2020 IEEE International Conference on Multimedia and EXPO (ICME), IEEE, Jul. 6, 2020 (Jul. 6, 2020), pp. 1-6, XP033808247, DOI: 10.1109/ICME46284.2020.9102859 [retrieved on May 27, 2020], The Whole Document.

Kumar A., et al., "Knowledge Transfer from Weakly Labeled Audio Using Convolutional Neural Network for Sound Events and Scenes", 2018 IEEE International Conference on Acoustics, Speech and Signal Processing (ICASSP), IEEE, Apr. 15, 2018 (Apr. 15, 2018), pp. 326-330, XP033401471, DOI: 10 1109/ICASSP.2018.8462200 [retrieved on Sep. 10, 2018] figure 1.

* cited by examiner

SOUND EVENT DETECTION LEARNING

I. CROSS-REFERENCE TO RELATED APPLICATIONS

The present application claims priority from Provisional Patent Application No. 62/939,801, filed Nov. 25, 2019, entitled "SOUND EVENT DETECTION LEARNING," the content of which is incorporated herein by reference in its entirety.

II. FIELD

The present disclosure is generally related to sound event detection and to updating sound event detection models.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Sound Event Detection (SED) is a research area that has seen recent advances. SED attempts to recognize sound events (e.g., slamming doors, car horns, etc.) in an audio signal. An SED system is generally trained using a supervised machine learning technique to recognize a specific set of sounds that are identified in labeled training data. As a result, each SED system tends to be domain specific (e.g., capable of classifying a predetermined set of sounds). After an SED system is trained, it is difficult to update the SED system to recognize new sounds that were not identified in the labeled training data. For example, an SED system can be trained using a set of labeled audio data samples that include a selection of city noises, such as car horns, sirens, slamming doors, and engine sounds. In this example, if a need arises to also recognize a sound that was not labeled in the set of labeled audio data samples, such as a doorbell, updating the SED system to recognize the doorbell involves completely retraining the SED system using both labeled audio data samples for the doorbell as well as the original set of labeled audio data samples. As a result, training an SED system to recognize a new sound requires approximately the same computing resources (e.g., processor cycles, memory, etc.) as generating a brand-new SED system. Further, over time, as even more sounds are added to be recognized, the number of audio data samples that must be maintained and used to train the SED system can become unwieldy.

IV. SUMMARY

In a particular aspect, a device includes a processor configured to receive audio data samples. The processor is further configured to provide the audio data samples to a first neural network trained to generate a first output corresponding to a first count of classes of a first set of sound classes. The processor is also configured to provide the audio data samples to a second neural network to generate a second output corresponding to a second count of classes of a second set of sound classes. The second count of classes is greater than the first count of classes. The processor is further configured to provide the first output to a neural adapter to generate a third output corresponding to the second count of classes of the second set of sound classes and to provide the second output and the third output to a merger adapter to generate sound event identification data based on the audio data samples.

In a particular aspect, a method includes receiving audio data samples and providing the audio data samples to a first neural network trained to generate a first output corresponding to a first count of classes of a first set of sound classes. The method further includes providing the audio data samples to a second neural network to generate a second output corresponding to a second count of classes of a second set of sound classes. The second count of classes is greater than the first count of classes. The method also includes providing the first output to a neural adapter to generate a third output corresponding to the second count of classes of the second set of sound classes. The method further includes providing the second output and the third output to a merger adapter to generate sound event identification data based on the audio data samples.

In a particular aspect, a non-transitory computer-readable storage medium, the computer-readable storage medium including instructions that when executed by a processor, cause the processor to provide audio data samples to a first neural network trained to generate a first output corresponding to a first count of classes of a first set of sound classes. The instructions further cause the processor to provide the audio data samples to a second neural network to generate a second output corresponding to a second count of classes of a second set of sound classes. The second count of classes is greater than the first count of classes. The instructions also cause the processor to provide the first output to a neural adapter to generate a third output corresponding to the second count of classes of the second set of sound classes. The instructions further cause the processor to provide the second output and the third output to a merger adapter to generate sound event identification data based on the audio data samples.

In a particular aspect, a device includes means for generating a first output based on audio data samples, the first output corresponding to a first count of classes of a first set of sound classes. The device further includes means for generating a second output based on the audio data samples, the second output corresponding to a second count of classes of a second set of sound classes. The second count of classes is greater than the first count of classes. The device also includes means for generating a third output based on the first output, the third output corresponding to the second count of classes of the second set of sound classes. The device further includes means for generating sound event identification data based on the third output and the second output.

In a particular aspect, a device includes a memory and a processor coupled to the memory. The memory stores a sound event classifier trained to generate first sound identification data in response to input of audio data representing one or more of a first set of sound classes. The processor is configured to generate an updated sound event classifier that is trained to generate second sound identification data in response to input of audio data representing one or more of a second set of sound classes. The second set of count classes includes the first set of sound classes and one or more additional sound classes. The updated sound event classifier includes the sound event classifier, a second sound event classifier, a neural adapter, and a merger adapter. The neural adapter includes one or more adapter layers configured to receive an input having a count of data elements corresponding to an output layer of the sound event classifier and configured to generate an output having a second count of data elements corresponding to an output layer of the second sound event classifier. The merger adapter includes one or more aggregation layers and an output layer. The one or more aggregation layers are configured to merge the output from neural adapter and an output of the second neural network. The output layer is configured to generate the second sound identification data.

In a particular aspect, a device includes means for storing a sound event classifier trained to generate first sound identification data in response to input of audio data representing one or more of a first set of sound classes. The device also includes means for generating an updated sound event classifier trained to generate second sound identification data in response to input of audio data representing one or more of a second set of sound classes. The second set of sound classes includes the first set of sound classes and one or more additional sound classes. The updated sound event classifier includes the sound event classifier, a second sound event classifier, a neural adapter, and a merger adapter. The neural adapter includes one or more adapter layers configured to receive an input having a count of data elements corresponding to an output layer of the sound event classifier and configured to generate an output having a second count of data elements corresponding to an output layer of the second sound event classifier. The merger adapter includes one or more aggregation layers and an output layer. The one or more aggregation layers are configured to merge the output from the neural adapter and an output of the second sound event classifier. The output layer is configured to generate the second sound identification data.

In a particular aspect, a method includes generating a second neural network based on a first neural network of a first sound event classifier. The first neural network includes an input layer, hidden layers, and a first output layer, and the second neural network includes a copy of the input layer of the first neural network, a copy of the hidden layers of the first neural network, and a second output layer coupled to the copy of the hidden layers. The first output layer includes a first count of output nodes and the second output layer includes a second count of output node, where the second count of output nodes is greater than the first count of output nodes. The method also includes linking the first neural network and the second neural network to one or more adapter networks and providing labeled training data as input to the first neural network and to the second neural network. The method also includes modifying output of the first neural network and the second neural network via the one or more adapter networks. The method further includes training a second sound event classifier by updating link weights of the second neural network and of the one or more adapter networks based on output of the adapter networks and labels of the labeled training data.

In a particular aspect, a non-transitory computer-readable storage medium includes instructions that when executed by a processor, cause the processor to generate a second neural network based on a first neural network of a first sound event classifier. The first neural network includes an input layer, hidden layers, and a first output layer, and the second neural network includes a copy of the input layer of the first neural network, a copy of the hidden layers of the first neural network, and a second output layer coupled to the copy of the hidden layers. The first output layer includes a first count of output nodes and the second output layer includes a second count of output node, where the second count of output nodes is greater than the first count of output nodes. The instructions further cause the processor to link the first neural network and the second neural network to one or more adapter networks. The instructions also cause the processor to provide labeled training data as input to the first neural network and to the second neural network and modify output of the first neural network and the second neural network via the one or more adapter networks. The instructions further cause the processor to train a second sound event classifier by updating link weights of the second neural network and of the one or more adapter networks based on output of the adapter networks and labels of the labeled training data.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 1 is a block diagram of an example of a device that is configured to generate sound identification data responsive to audio data samples and configured to generate an updated sound event detection model.

FIG. 2 a block diagram illustrating aspects of a sound event detection model according to a particular example.

VI. DETAILED DESCRIPTION

Figure 1:
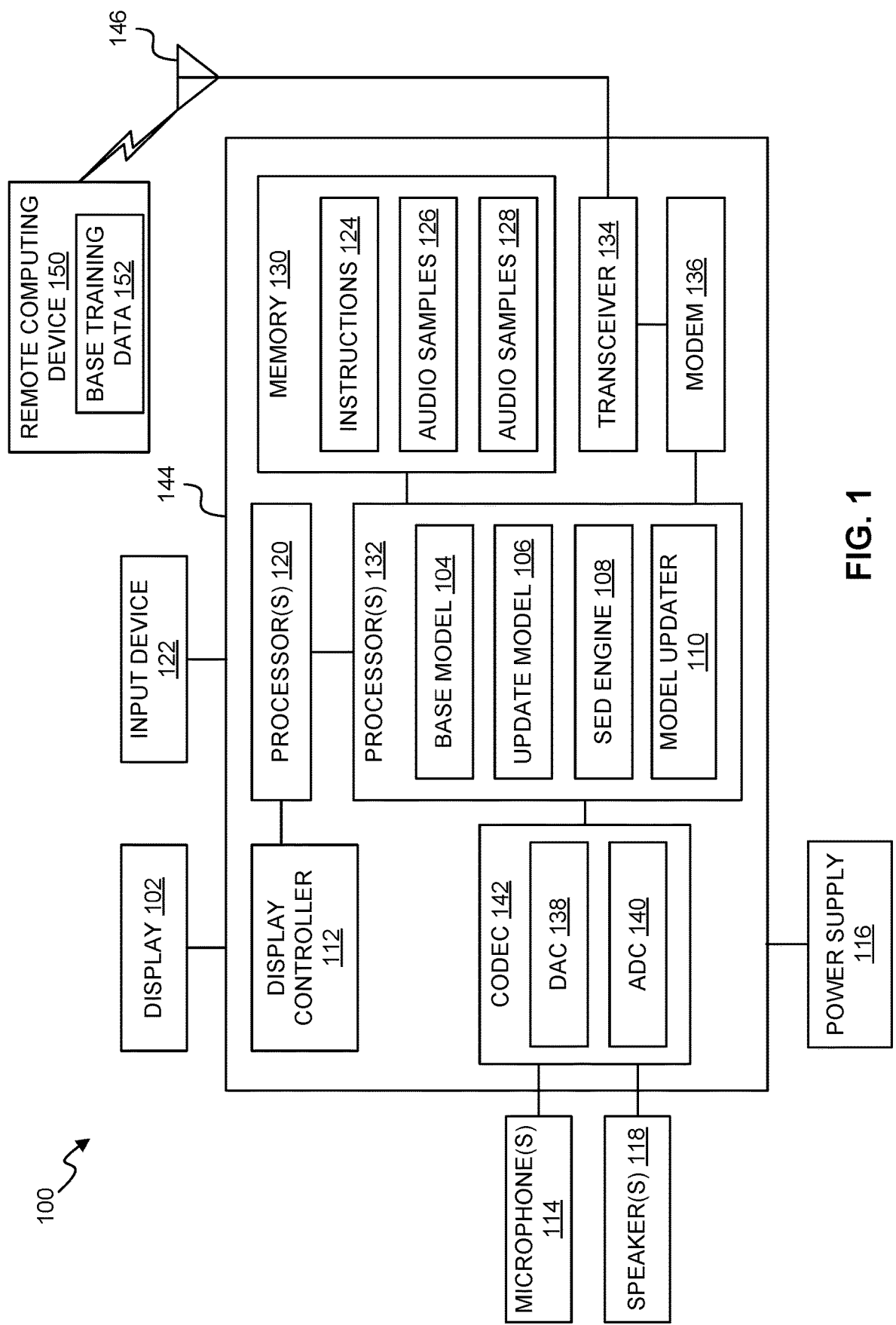

Sound event detection models can be trained using machine-learning techniques. For example, a neural network can be trained as a sound event classifier using backpropagation or other machine-learning training techniques. A sound event detection model trained in this manner can be small enough (in terms of storage space occupied) and simple enough (in terms of computing resources used during operation) for a portable computing device to store and use the sound event detection model. However, the training process uses significantly more processing resources than are used to perform sound event detection using the trained sound event detection model. Additionally, the training process uses a large set of labeled training data including many audio data samples for each sound class that the sound event detection model is being trained to detect. Thus, it may be prohibitive in terms of memory utilization or other computing resources, to train a sound event detection model from scratch on a portable computing device or another resource limited computing device. As a result, a user who desires to use a sound event detection model on a portable computing device may be limited to downloading pre-trained sound event detection models onto the portable computing device from a less resource constrained computing device or a library of pre-trained sound event detection models. Thus, the user has limited customization options.

The disclosed systems and methods use transfer learning techniques to generate updated sound event detection models in a manner that is significantly less resource intensive than training sound event detection models from scratch. According to a particular aspect, the transfer learning techniques can be used to generate an updated sound event detection model based on a previously trained sound event detection model (also referred to herein as a "base model"). The updated sound event detection model is configured to detect more types of sound events than the base model is. For example, the base model is trained to detect any of a first set of sound events, each of which corresponds to a sound class of a first set of sound classes, and the updated sound event detection model is trained to detect any of the first set of sound events as well as any of a second set of sound events, each of which corresponds to a sound class of a second set of sound classes. Accordingly, the disclosed systems and methods reduce the computing resources (e.g., memory, processor cycles, etc.) used to generate an updated sound event detection model. As one example of a use case for the disclosed system and methods, a portable computing device can be used to generate a custom sound event detector.

According to a particular aspect, an updated sound event detection model is generated based on a previously trained sound event detection model, a subset of the training data used to train the previously trained sound event detection model, and one or more sets of training data corresponding to one or more additional sound classes that the updated sound event detection model is to be able to detect. In this aspect, the previously trained sound event detection model (e.g., a first model) is retained and unchanged. Additionally, a copy of the previously trained sound event detection model (e.g., a second model) is generated and modified to have a new output layer. The new output layer includes an output node for each sound class that the updated sound event detection model is to be able to detect. For example, if the first model is configured to detect ten distinct sound classes, then an output layer of the first model may include ten output nodes. In this example, if the updated sound event detection model is to be trained to detect twelve distinct sound classes (e.g., the ten sound classes that the first model is configured to detect plus two additional sound classes), then the output layer of the second model includes twelve output nodes.

One or more adapter networks are generated to link output of the first model and output of the second model. For example, the adapter network(s) convert an output of the first model to have a size corresponding to an output of the second model. To illustrate, in the example of the previous paragraph, the first model includes ten output nodes and generates an output having ten data elements, and the second model includes twelve output nodes and generates an output having twelve data elements. In this example, the adapter network(s) modify the output of the first model to have twelve data elements. The adapter network(s) also combine the output of the second model and the modified output of the first model to generate a sound classification output of the updated sound event detection model.

The updated sound event detection model is trained using labeled training data that includes audio data samples and labels for each sound class that the updated sound event detection model is being trained to detect. However, since the first model is already trained to accurately detect the first set of sound classes, the labeled training data includes far fewer audio data samples for the first set of sound classes than were originally used to train the first model. To illustrate, the first model can be trained using hundreds or thousands of audio data samples for each sound class of the first set of sound classes. In contrast, the labeled training data used to train the updated sound event detection model can include tens or fewer of audio data samples for each sound class of the first set of sound classes. The labeled training data also includes audio data samples for each sound class of the second set of sound classes. The audio data samples for the second set of sound classes can also include tens or fewer audio data samples for each sound class of the second set of sound classes.

Backpropagation or another machine-learning technique is used to train the second model and the one or more adapter networks. During this process, the first model is unchanged, which limits or eliminates the risk that the first model will forget its prior training. For example, during its previous training, the first model was trained using a large labeled training data set to accurately detect the first set of sound classes. Retraining the first model using the relatively small labeled training data set used during backpropagation risks causing the accuracy of the first model to decline (sometimes referred to as "forgetting" some of its prior training). Retaining the first model unchanged while training the updated sound event detector model mitigates the risk of forgetting the first set of sound classes.

Additionally, before training, the second model is identical to the first model except for the output layer of the second model and interconnections therewith. Thus, at the starting point of the training, the second model is expected to be closer to convergence (e.g., closer to a training termination condition) than a randomly seeded model. As a result, fewer iterations should be needed to train the second model than were used to train the first model.

After the updated sound event detection model is trained, the updated sound event detection model (rather than the first model alone) can be used to detect sound events. For example, when audio data samples are received, the audio data samples are provided as input to the updated sound event detection model, and the updated sound event detection model generates a sound classification output. Within the updated sound event detection model, the audio data samples are provided as input to the first model and to the second model. The first model generates a first output, which is provided to the adapter network(s), modified, and combined with a second output from the second model. The adapter network(s) generate a third output corresponding to the sound classification output of the updated sound event detection model.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 100 including one or more microphone ("microphone(s) 114" in FIG. 1), which indicates that in some implementations the device 100 includes a single microphone 114 and in other implementations the device 100 includes multiple microphones 114. For ease of reference herein, such features are generally introduced as "one or more" features and are subsequently referred to in the singular or optional plural (generally indicated by terms ending in "(s)") unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of an example of a device 100 that is configured to generate sound identification data responsive to input of audio data samples. In FIG. 1, the device 100 is also configured to generate an updated sound event detection model. In some implementations, a remote computing device 150 generates the updated sound event detection model, and the device 100 uses the updated sound event detection model to generate sound identification data responsive to audio data samples. In some implementations, the remote computing device 150 and the device 100 cooperate to generate the updated sound event detection model, and the device 100 uses the updated sound event detection model to generate sound identification data responsive to audio data samples. In various implementations, the device 100 may have more or fewer components than illustrated in FIG. 1.

Figure 2:
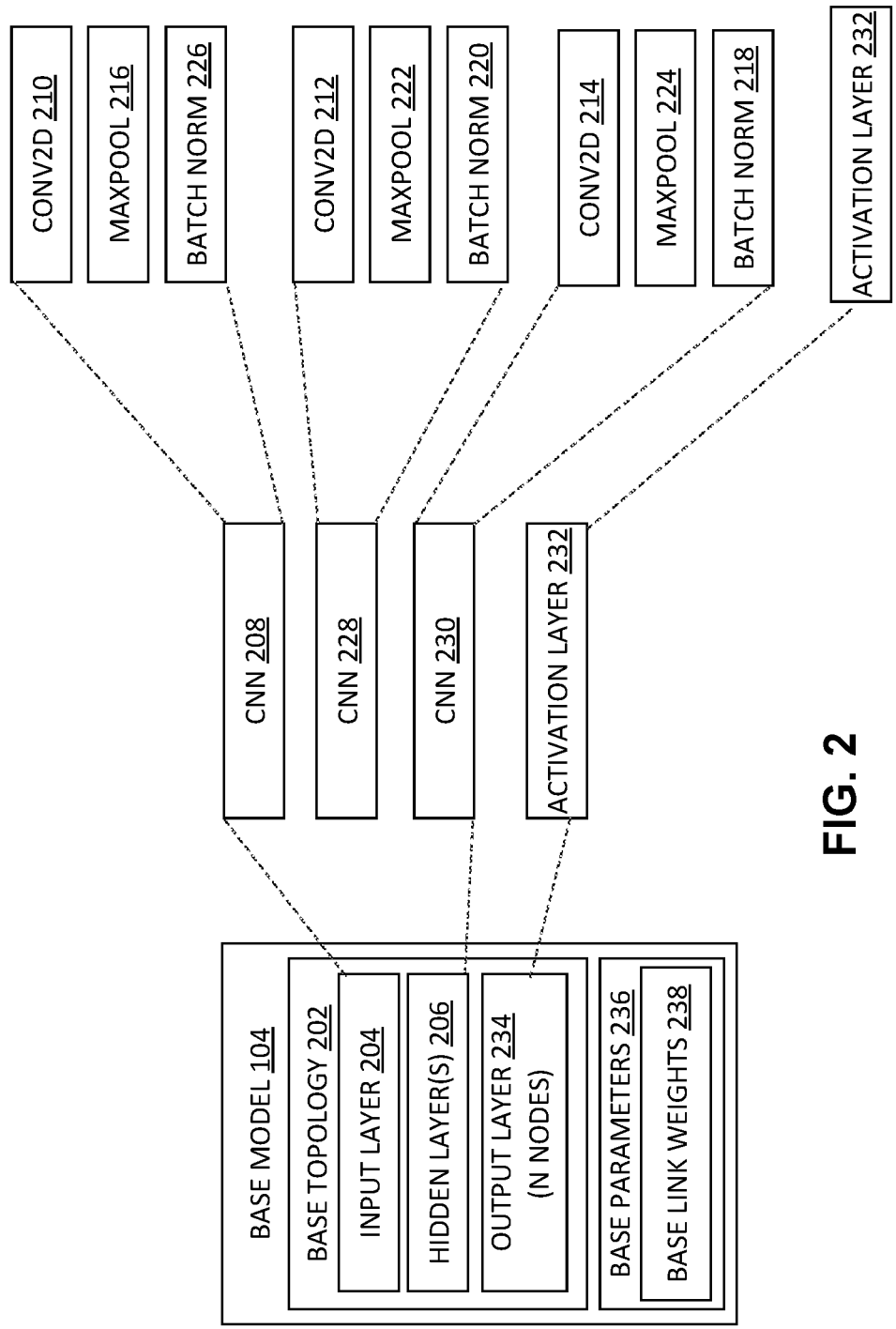

In a particular implementation, the device 100 includes a processor 120 (e.g., a central processing unit (CPU)). The device 100 may include one or more additional processor(s) 132 (e.g., one or more DSPs). The processor 120, the processor(s) 132, or both, may be configured to generate sound identification data, to generate an updated sound event detection model, or both. For example, in FIG. 1, the processor(s) 132 include a sound event detection (SED) engine 108. The SED engine 108 is configured to analyze audio data samples using a sound event classifier, such as a base model 104 or an update model 106. The base model 104 is a previously trained sound event detection model. In some implementations, another computing device, such as the remote computing device 150, trains the base model 104 and the base model 104 is stored on the device 100 as a default model, or the device downloads the base model from the other computing device. In some implementations, the device 100 trains the base model 104. Training the base model 104 entails use of a relatively large set of labeled training data (e.g., base training data 152 in FIG. 1). In some implementations whether the remote computing device 150 or the device 100 trains the base model 104, the base training data 152 is stored at the remote computing device 150, which may have greater storage capacity (e.g., more memory) than the device 100. FIG. 2 illustrates examples of particular implementations of the base model 104. The update model 106 is an updated sound event detection model that is based on the base model 104 and trained, as described further below, using a model updater 110.

Figure 3:
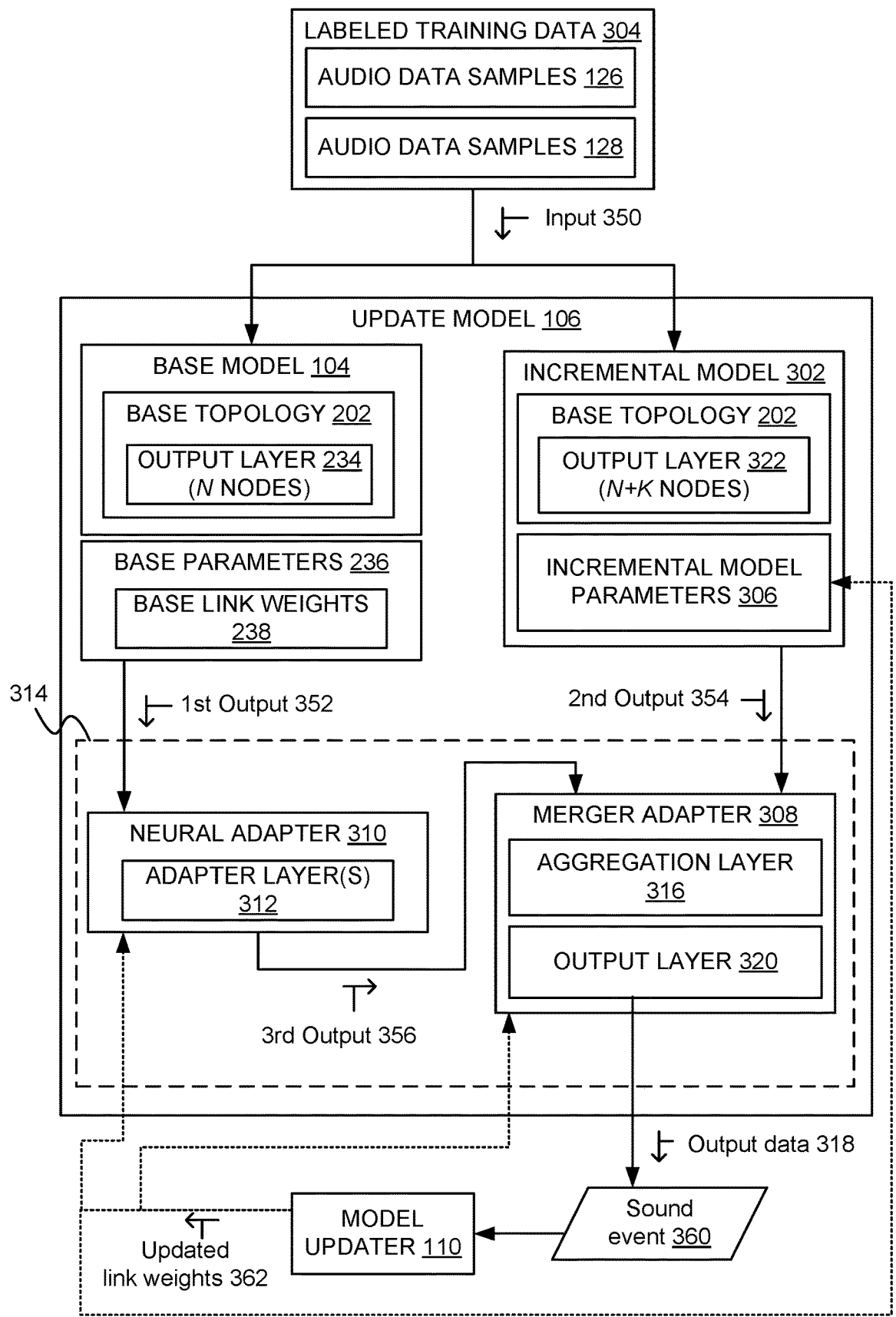
FIG. 3 is a diagram that illustrates aspects of generating an updated sound event detection model according to a particular example.

In FIG. 1, the device 100 also includes a memory 130 and a CODEC 142. The memory 130 stores instructions 124 that are executable by the processor 120, or the processor(s) 132, to implement one or more operations described with reference to FIGS. 3-15. In an example, the instructions 124 include or correspond to the SED engine 108, the model updater 110, or both. The memory 130 may also store the base model 104, the update model 106, or both. Further, in the example illustrated in FIG. 1, the memory 130 stores audio data samples 126 and audio data samples 128. The audio data samples 126 include audio data samples representing one or more of a first set of sound classes used to train the base model 104. That is, the audio data samples 126 include a relatively small subset of the base training data 152. In some implementations, the device 100 downloads the audio data samples 126 from the remote computing device 150 when the device 100 is preparing to generate the update model 106. The audio data samples 128 include audio data samples representing one or more of a second set of sound classes used to train the update model 106. In a particular implementation, the device 100 captures one or more of the audio data samples 128 (e.g., using the microphone(s) 114). In some implementations, the device 100 obtains one or more of the audio data samples 128 from another device, such as the remote computing device 150. FIG. 3 illustrates an example of operation of the model updater 110 to generate the update model 106 based on the base model 104, the audio data samples 126, and the audio data samples 128.

Figure 4:
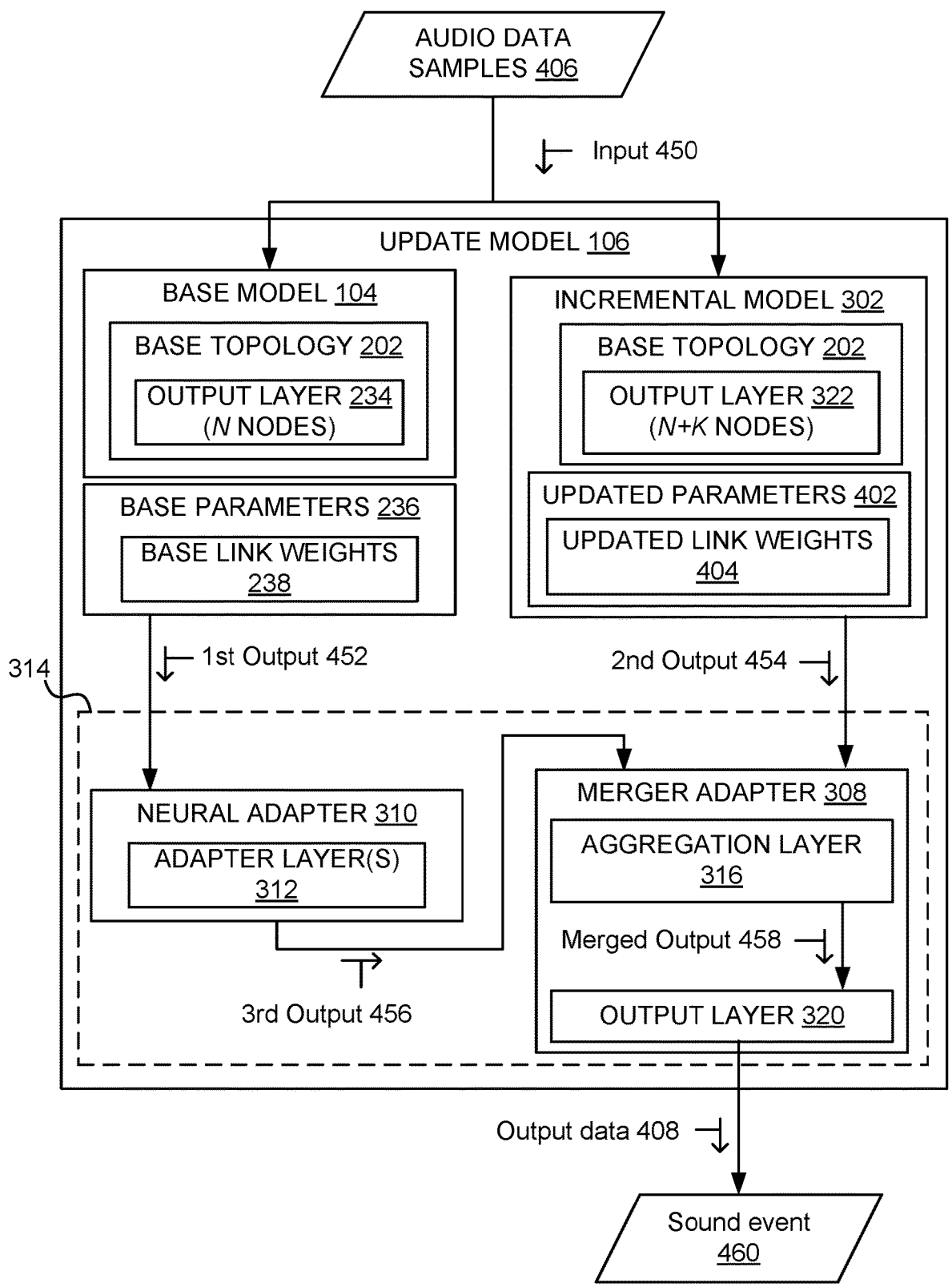
FIG. 4 is a diagram that illustrates aspects of generating sound event detection output data using an updated sound event detection model according to a particular example

In FIG. 1, speaker(s) 118 and the microphone(s) 114 may be coupled to the CODEC 142. In a particular aspect, the microphone(s) 114 are configured to receive audio representing an acoustic environment associated with the device 100 and to generate audio data samples that the SED engine 108 provides to the base model 104 or to the update model 106 to generate a sound classification output. FIG. 4 illustrates an example of operation of the update model 106 to generate output data indicating detection of a sound event. The microphone(s) 114 may also be configured to provide the audio data samples 128 to the model updater 110 or to the memory 130 for use in generating the update model 106.

In the example illustrated in FIG. 1, the CODEC 142 includes a digital-to-analog converter (DAC 138) and an analog-to-digital converter (ADC 140). In a particular implementation, the CODEC 142 receives analog signals from the microphone(s) 114, converts the analog signals to digital signals using the ADC 140, and provides the digital signals to the processor(s) 132. In a particular implementation, the processor(s) 132 (e.g., the speech and music codec) provide digital signals to the CODEC 142, and the CODEC 142 converts the digital signals to analog signals using the DAC 138 and provides the analog signals to the speaker(s) 118.

In FIG. 1, the device 100 also includes an input device 122. The device 100 may also include a display 102 coupled to a display controller 112. In a particular aspect, the input device 122 includes a sensor, a keyboard, a pointing device, etc. In some implementations, the input device 122 and the display 102 are combined in a touchscreen or similar touch or motion sensitive display. The input device 122 can be used to provide a label associated with one of the audio data samples 128 to generate labeled training data used to train the update model 106. In some implementations, the device 100 also includes a modem 136 coupled a transceiver 134. In FIG. 1, the transceiver 134 is coupled to an antenna 146 to enable wireless communication with other devices, such as the remote computing device 150. In other examples, the transceiver 134 is also, or alternatively, coupled to a communication port (e.g., an ethernet port) to enable wired communication with other devices, such as the remote computing device 150.

In a particular implementation, the device 100 is included in a system-in-package or system-on-chip device 144. In a particular implementation, the memory 130, the processor 120, the processor(s) 132, the display controller 112, the CODEC 142, the modem 136, and the transceiver 134 are included in a system-in-package or system-on-chip device 144. In a particular implementation, the input device 122 and a power supply 116 are coupled to the system-on-chip device 144. Moreover, in a particular implementation, as illustrated in FIG. 1, the display 102, the input device 122, the speaker(s) 118, the microphone(s) 114, the antenna 146, and the power supply 116 are external to the system-on-chip device 144. In a particular implementation, each of the display 102, the input device 122, the speaker(s) 118, the microphone(s) 114, the antenna 146, and the power supply 116 may be coupled to a component of the system-on-chip device 144, such as an interface or a controller.

The device 100 may include, correspond to, or be included within a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a smart speaker, a mobile computing device, a mobile communication device, a smart phone, a cellular phone, a laptop computer, a computer, a tablet, a personal digital assistant, a display device, a television, a gaming console, an appliance, a music player, a radio, a digital video player, a digital video disc (DVD) player, a tuner, a camera, a navigation device, or any combination thereof. In a particular aspect, the processor 120, the processor(s) 132, or a combination thereof, are included in an integrated circuit.

FIG. 2 is a block diagram illustrating aspects of the base model 104 according to a particular example. The base model 104 is a neural network that has a topology (e.g., a base topology 202) and trainable parameters (e.g., base parameters 236). The base topology 202 can be represented as a set of nodes and edges (or links); however, for ease of illustration and reference, the base topology 202 is represented in FIG. 2 as a set of layers. It should be understood that each layer of FIG. 2 includes a set of nodes, and that links interconnect the nodes of the different layers. The arrangement of the links depends on the type of each layer.

During backpropagation training, the base topology 202 is static and the base parameters 236 are changed. In FIG. 2, the base parameters 236 include base link weights 238. The base parameters 236 may also include other parameters, such as a bias value associated with one or more nodes of the base model 104.

The base topology 202 includes an input layer 204, one or more hidden layers (labeled hidden layer(s) 206 in FIG. 2), and an output layer 234. A count of input nodes of the input layer 204 depends on the arrangement of the audio data samples to be provided to the base model 104. For example, the audio data samples may include an array or matrix of data elements, with each data element corresponding to a feature of an input audio sample. As a specific example, the audio data samples can correspond to Mel spectrum features extracted from one second of audio data. In this example, the audio data samples can include a 128×128 element matrix of feature values. In other examples, other audio data sample configurations or sizes can be used. A count of nodes of the output layer 234 depends on a number of sound classes that the base model 104 is configured to detect. As an example, the output layer 234 may include one output node for each sound class.

The hidden layer(s) 206 can have various configurations and various numbers of layers depending on the specific implementations. FIG. 2 illustrates one particular example of the hidden layer(s) 206. In FIG. 2, the hidden layer(s) 206 include three convolutional neural networks (CNNs), including a CNN 208, a CNN 228, and a CNN 230. In this example, the output layer 234 includes or corresponds to an activation layer 232. For example, the activation layer 232 receives the output of the CNN 230 and applies an activation function (such as a sigmoid function) to the output to generate as output a set of data elements which each include either a one value or a zero value.

FIG. 2 also illustrates details of one particular implementation of the CNN 208, the CNN 228, and the CNN 230. In the specific example illustrated in FIG. 2, the CNN 208 includes a two-dimensional (2D) convolution layer (conv2d 210 in FIG. 2), a maxpooling layer (maxpool 216 in FIG. 2), and batch normalization layer (batch norm 226 in FIG. 2). Likewise, in FIG. 2, the CNN 228 includes a conv2d 212, a maxpool 222, and a batch norm 220, and the CNN 230 includes a conv2d 214, a maxpool 224, and a batch norm 218. In other implementations, the hidden layer(s) 206 include a different number of CNNs or other layers.

As explained above, the update model 106 includes the base model 104, a modified copy of the base model 104, and one or more adapter networks. The modified copy of the base model 104 uses the same base topology 202 as illustrated in FIG. 2 except that an output layer of the modified copy includes more output nodes than the output layer 234. Additionally, before training the update model 106, the modified copy is initialized to have the same base parameters 236 as the base model 104.

FIG. 3 is a diagram that illustrates aspects of generating the update model 106 according to a particular example. The operations described with reference to FIG. 3 can be initiated, performed, or controlled by the processor 120 or the processor(s) 132 of FIG. 1 executing the instructions 124. Alternatively, the operations described with reference to FIG. 3 may be performed by the remote computing device 150 using audio data samples 128 captured at the device 100 and audio data samples 126 from the base training data 152. If the operations described with reference to FIG. 3 are performed at the remote computing device 150, the device 100 may download the update model 106 or a portion thereof, such as an incremental model 302 and one or more adapter networks 314, from the remote computing device 150.

To generate the update model 106, the model updater 110 copies the base model 104 and replaces the output layer 234 of the copy of the base model 104 with a different output layer (e.g., an output layer 322 in FIG. 3) to generate an incremental model 302 (also referred to herein as a second model). The incremental model 302 includes the base topology 202 of the base model 104 except for replacement of the output layer 234 with the output layer 322 and links generated to link the output nodes of the output layer 322 to hidden layers of the incremental model 302. Model parameters of the incremental model 302 (e.g., incremental model parameters 306) are initialized to be equal to the base parameters 236. The output layer 234 of the base model 104 includes a first count of nodes (e.g., N nodes in FIG. 3, where N is a positive integer), and the output layer 322 of the incremental model 302 includes a second count of nodes (e.g., N+K nodes in FIG. 3, where K is a positive integer). The first count of nodes corresponds to the count of sound classes of a first set of sound classes that the base model 104 is trained to recognize (e.g., the first set of sound classes includes N distinct sound classes that the base model 104 can recognize). The second count of nodes corresponds to the count of sound classes of a second set of sound classes that the update model 106 is to be trained to recognize (e.g., the second set of sound classes includes N+K distinct sound classes that the update model 106 is to be trained to recognize). Thus, the second set of sound classes includes the first set of sound classes (e.g., N classes) plus one or more additional sound classes (e.g., K classes).

In addition to generating the incremental model 302, the model updater 110 generates one or more adapter network(s) 314. In FIG. 3, the adapter network(s) 314 include a neural adapter 310 and a merger adapter 308. The neural adapter 310 includes one or more adapter layers (e.g., adapter layer(s) 312 in FIG. 3). The adapter layer(s) 312 are configured to receive input from the base model 104 and to generate output that can be merged with the output of the incremental model 302. For example, the base model 104 can generate as output a first output 352 corresponding to the first count of classes of the first set of sound classes. For example, the first output include one data element for each node of the output layer 234 (e.g., N data elements). In contrast, the incremental model 302 generates as output a second output 354 corresponding to the second count of classes of the second set of sound classes. For example, the second output 354 includes one data element for each node of the output layer 322 (e.g., N+K data elements). In this example, the adapter layer(s) 312 receive an input having the first count of data elements and generate a third output 356 having the second count of data elements (e.g., N+K). In a particular example, the adapter layer(s) 312 include two fully connected layers (e.g., an input layer including N nodes and an output layer including N+K nodes, with each node of the input layer connected to every node of the output layer).

The merger adapter 308 is configured to generate output data 318 by merging the third output 356 from the neural adapter 310 and the second output 354 of the incremental model 302. In FIG. 3, the merger adapter 308 includes an aggregation layer 316 and an output layer 320. The aggregation layer 316 is configured to combine the second output 354 and the third output 356 in an element-by-element manner. For example, the aggregation layer 316 can add each element of the third output 356 from the neural adapter 310 to a corresponding element of the second output 354 from the incremental model 302 and provide the resulting merged output to the output layer 320. The output layer 320 is an activation layer that applies an activation function (such as a sigmoid function) to the merged output to generate the output data 318. The output data 318 includes or corresponds to a sound event identifier 360 indicating a sound class to which the update model 106 assigns a particular audio sample (e.g., one of the audio data samples 126 or 128).

During training, the model updater 110 provides labeled training data 304 to the base model 104 and the incremental model 302. The labeled training data 304 includes one or more of the audio data samples 126 (which were used to train the base model 104) and one or more audio data samples 128 (which correspond to new sound classes that the base model 104 is not trained to recognize). In response to a particular audio sample of the labeled training data 304, the base model 104 generates the first output 352 that is provided as input to the neural adapter 310. Additionally, in response to the particular audio sample, the incremental model 302 generates the second output 354 that is provided, along with the third output 356 of the neural adapter 310, to the merger adapter 308. The merger adapter 308 merges the second output 354 and third output 356 to generate a merged output and generates the output data 318 based on the merged output.

The output data 318, the sound event identifier 360, or both, are provided to the model updater 110 which compares the sound event identifier 360 to a label associated, in the labeled training data 304, with the particular audio sample and calculates updated link weight values (updated link weights 362 in FIG. 3) to modify the incremental model parameters 306, link weights of the neural adapter 310, link weights of the merger adapter 308, or a combination thereof. The training process continues iteratively until the model updater 110 determines that a training termination condition is satisfied. For example, the model updater 110 calculates an error value based on the labeled training data 304 and the output data 318. In this example, the error value indicates how accurately the update model 106 classifies each audio data sample 126 and 128 of the labeled training data 304 based on a label associated with each audio data sample 126 and 128. In this example, the training termination condition may be satisfied when error value is less than a threshold or when a change in the error value between training iterations is less than a threshold. In some implementations, the termination condition is satisfied when a count of training iterations performed is greater than or equal to a threshold count.

FIG. 4 is a diagram that illustrates aspects of using the update model 106 to generate sound event detection output data according to a particular example. The operations described with reference to FIG. 4 can be initiated, performed, or controlled by the processor 120 or the processor(s) 132 of FIG. 1 executing the instructions 124.

In FIG. 4, one or more inputs 450 including audio data samples 406 are provided to the base model 104 and to the incremental model 302 of the update model 106. In a particular example, the audio data samples 406 includes, corresponds to, or are based on audio captured by the microphone(s) 114 of the device 100 of FIG. 1. For example, the audio data samples 406 may correspond to features extracted from several seconds of audio data, and the input 450 may include an array or matrix of feature data extracted from the audio data.

In response to the input 450, the base model 104 generates a first output 452 that is provided as input to the neural adapter 310. The base model 104 generates the first output 452 using the base parameters 236, including the base link weights 238. The first output 452 of the base model 104 corresponds to the first count of classes of the first set of sound classes. In an illustrative example, the first output 452 includes an array or matrix of data elements and has a count of data element (e.g., N data elements) corresponding to the number of output nodes (e.g., N nodes) of the output layer 234 of the base model 104, and the number of output nodes of the output layer 234 corresponds to the first count of classes of the first set of sound classes.

In response to the input 450, the incremental model 302 generates a second output 454 that is provided to the merger adapter 308. The second output 454 of the incremental model 302 corresponds to the second count of classes of the second set of sound class. In an illustrative example, the second output 454 includes an array or matric of data elements and has a count of data element (e.g., N+K data elements) corresponding to the number of output nodes (e.g., N+K nodes) of the output layer 322 of the incremental model 302, and the number of output nodes of the output layer 322 corresponds to the second count of classes of the second set of sound classes. The incremental model 302 generates the second output 454 using updated parameters 402, including updated link weights 404, which are generated by the model updater 110 during the training process. In a particular implementation, the updated parameters 402 correspond to the parameters of the incremental model 302 that satisfied the training termination condition described with reference to FIG. 3.

The neural adapter 310 generates a third output 456 based on the first output 452 from the base model 104. In a particular example, the neural adapter 310 generates the third output 456 based on link weights trained by the model updater 110 during the training process. The third output 456 of the neural adapter 310 corresponds to the second count of classes of the second set of sound class. In an illustrative example, the third output 456 includes an array or matrix of data elements and has a count of data element (e.g., N+K data elements) corresponding to the second count of classes of the second set of sound classes.

The third output 456 from the neural adapter 310 and the second output 454 from the incremental model 302 are provided to the merger adapter 308. The aggregation layer 316 of the merger adapter 308 combines the third output 456 and the second output 454, element-by-element, to generate a merged output 458. The output layer 320 of the merger adapter 308 generates the output data 408 based on the merged output 458. In a particular example, the merger adapter 308 generates the output data 408 based on link weights trained by the model updater 110 during the training process. The output data 408 includes sound identification data (e.g., a sound event identification data 460) indicating a sound class associated with the audio data samples 406.

Figure 5:
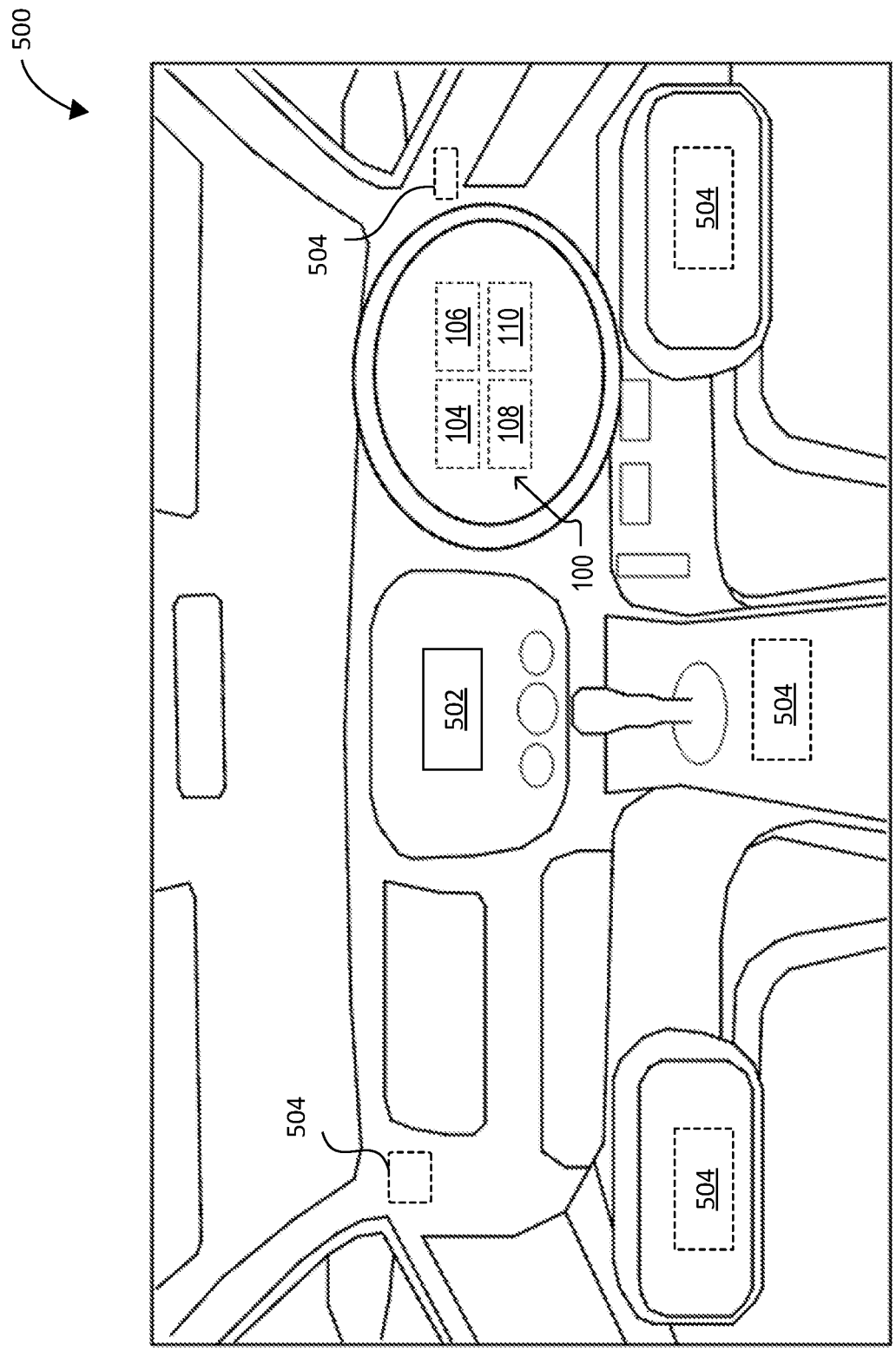
FIG. 5 is an illustrative example of a vehicle that incorporates aspects of the updated sound event detection model of FIG. 1, FIG. 3, or FIG. 4.

FIG. 5 is an illustrative example of a vehicle 500 that incorporates aspects of the updated sound event detection model 106 of FIG. 1, FIG. 3, or FIG. 4. According to one implementation, the vehicle 500 is a self-driving car. According to other implementations, the vehicle 500 is a car, a truck, a motorcycle, an aircraft, a water vehicle, etc. In FIG. 5, the vehicle 500 includes a screen 502 (e.g., a display, such as the display 102 of FIG. 1), sensor(s) 504, the device 100, or a combination thereof. The sensor(s) 504 and the device 100 are shown using a dotted line to indicate that these components might not be visible to passengers of the vehicle 500. The device 100 can be integrated into the vehicle 500 or coupled to the vehicle 500.

In a particular aspect, the device 100 is coupled to the screen 502 and provides an output to the screen 502 responsive to detecting or recognizing various events (e.g., sound events) described herein. For example, the device 100 provides the output data 408 of FIG. 4 to the screen 502 indicating that a recognized sound event, such as a car horn, is detected in audio data received from the sensor(s) 504. In some implementations, the device 100 can perform an action responsive to recognizing a sound event, such as activating a camera or one of the sensor(s) 504. In a particular example, the device 100 provides an output that indicates whether an action is being performed responsive to the recognized sound event. In a particular aspect, a user can select an option displayed on the screen 502 to enable or disable a performance of actions responsive to recognized sound events.

In a particular implementations, the sensor(s) 504 include one or more microphone(s) 114 of FIG. 1, vehicle occupancy sensors, eye tracking sensor, or external environment sensors (e.g., lidar sensors or cameras). In a particular aspect, sensor input of the sensor(s) 504 indicates a location of the user. For example, the sensor(s) 504 are associated with various locations within the vehicle 500.

The device 100 in FIG. 5 includes the base model 104, the update model 106, the SED engine 108, and the model updater 110. However, in other implementations, the device 100, when installed in or used in the vehicle 500, omits the model updater 110. To illustrate, the remote computing device 150 of FIG. 1 may generate the update model 106. In such implementations, the update model 106 can be downloaded to the vehicle 500 for used by the SED engine 108.

Thus, the techniques described with respect to FIGS. 1-4 enable a user of the vehicle 500 to update a sound event detection model (e.g., the base model 104) stored in a memory of the vehicle 500 to generate a sound event detection model (e.g., the update model 106) that is able to detect a new set of sound classes. In addition, the sound event detection model can be updated without excessive use of computing resources onboard the vehicle 500. For example, the vehicle 500 does not have to store all of the base training data 152 used train the base model 104 in a local memory in order to avoid forgetting training associated with the base training data 152. Rather, the model updater 110 retains the base model 104 while generating the update model 106. The model update process also converges faster (e.g., uses fewer processor cycles) than would be used to generate a new sound event detection model from scratch.

Figure 6:
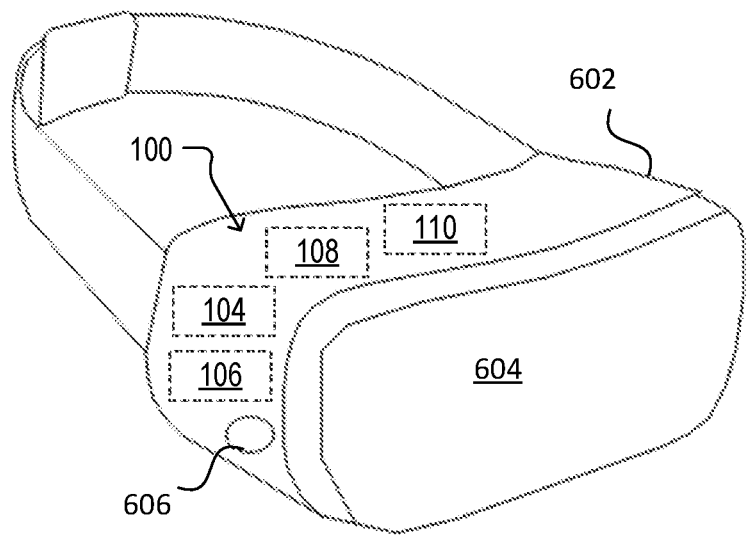
FIG. 6 illustrates virtual reality or augmented reality headset that incorporates aspects of the updated sound event detection model of FIG. 1, FIG. 3, or FIG. 4.

FIG. 6 depicts an example of the device 100 coupled to or integrated within a headset 602, such as a virtual reality headset, an augmented reality headset, a mixed reality headset, an extended reality headset, a head-mounted display, or a combination thereof. A visual interface device, such as a display 604, is positioned in front of the user's eyes to enable display of augmented reality or virtual reality images or scenes to the user while the headset 602 is worn. In a particular example, the display 604 is configured to display output of the device 100, such as an indication of a recognized sound event (e.g., the sound event identification data 460). The headset 602 can include one or more sensor(s) 606, such as microphone(s) 114 of FIG. 1, cameras, other sensors, or a combination thereof. Although illustrated in a single location, in other implementations one or more of the sensor(s) 606 can be positioned at other locations of the headset 602, such as an array of one or more microphones and one or more cameras distributed around the headset 602 to detect multi-modal inputs.

The sensor(s) 606 enable detection of audio data, which the device 100 uses to detect sound events or to update the base model 104 to generate the update model 106. For example, the device 100 provides the output data 408 of FIG. 4 to the display 604 indicating that a recognized sound event, such as a car horn, is detected in audio data received from the sensor(s) 606. In some implementations, the device 100 can perform an action responsive to recognizing a sound event, such as activating a camera or one of the sensor(s) 606 or providing haptic feedback to the user.

In the example illustrated in FIG. 6, the device 100 includes the base model 104, the update model 106, the SED engine 108, and the model updater 110. However, in other implementations, the device 100, when installed in or used in the headset 602, omits the model updater 110. To illustrate, the remote computing device 150 of FIG. 1 may generate the update model 106. In such implementations, the update model 106 can be downloaded to the headset 602 for used by the SED engine 108.

Figure 7:
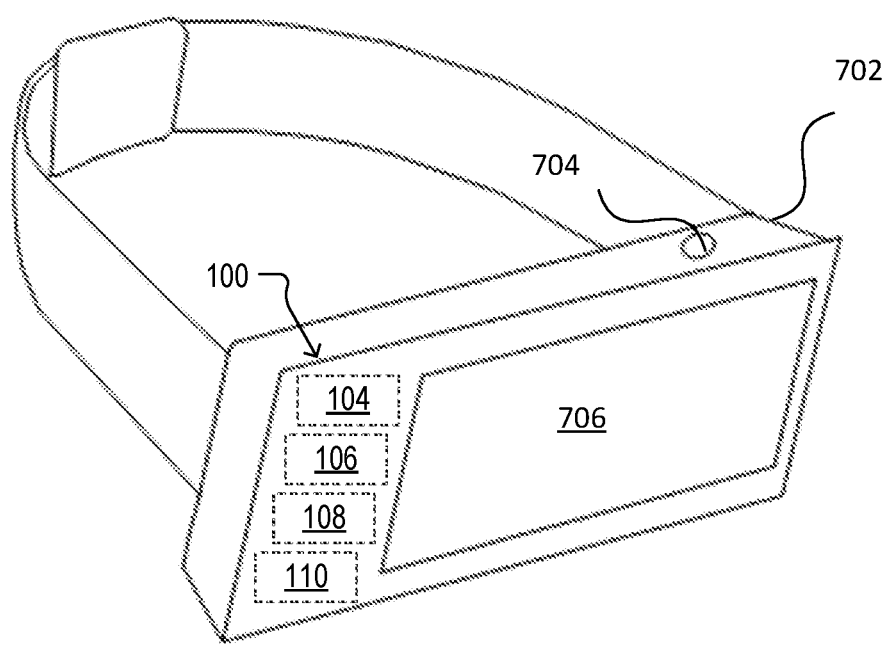
FIG. 7 illustrates a wearable electronic device that incorporates aspects of the updated sound event detection model of FIG. 1, FIG. 3, or FIG. 4.

FIG. 7 depicts an example of the device 100 integrated into a wearable electronic device 702, illustrated as a "smart watch," that includes a display 706 (e.g., the display 102 of FIG. 1) and sensor(s) 704. The sensor(s) 704 enable detection, for example, of user input based on modalities such as video, speech, and gesture. The sensor(s) 704 also enable detection of audio data, which the device 100 uses to detect sound events or to update the base model 104 to generate the update model 106. For example, the sensor(s) 704 may include or correspond to the microphone(s) 114 of FIG. 1.

The sensor(s) 704 enable detection of audio data, which the device 100 uses to detect sound events or to update the base model 104 to generate the update model 106. For example, the device 100 provides the output data 408 of FIG. 4 to the display 706 indicating that a recognized sound event is detected in audio data received from the sensor(s) 704. In some implementations, the device 100 can perform an action responsive to recognizing a sound event, such as activating a camera or one of the sensor(s) 704 or providing haptic feedback to the user.

In the example illustrated in FIG. 7, the device 100 includes the base model 104, the update model 106, the SED engine 108, and the model updater 110. However, in other implementations, the device 100, when installed in or used in the wearable electronic device 702, omits the model updater 110. To illustrate, the remote computing device 150 of FIG. 1 may generate the update model 106. In such implementations, the update model 106 can be downloaded to the wearable electronic device 702 for used by the SED engine 108.

Figure 8:
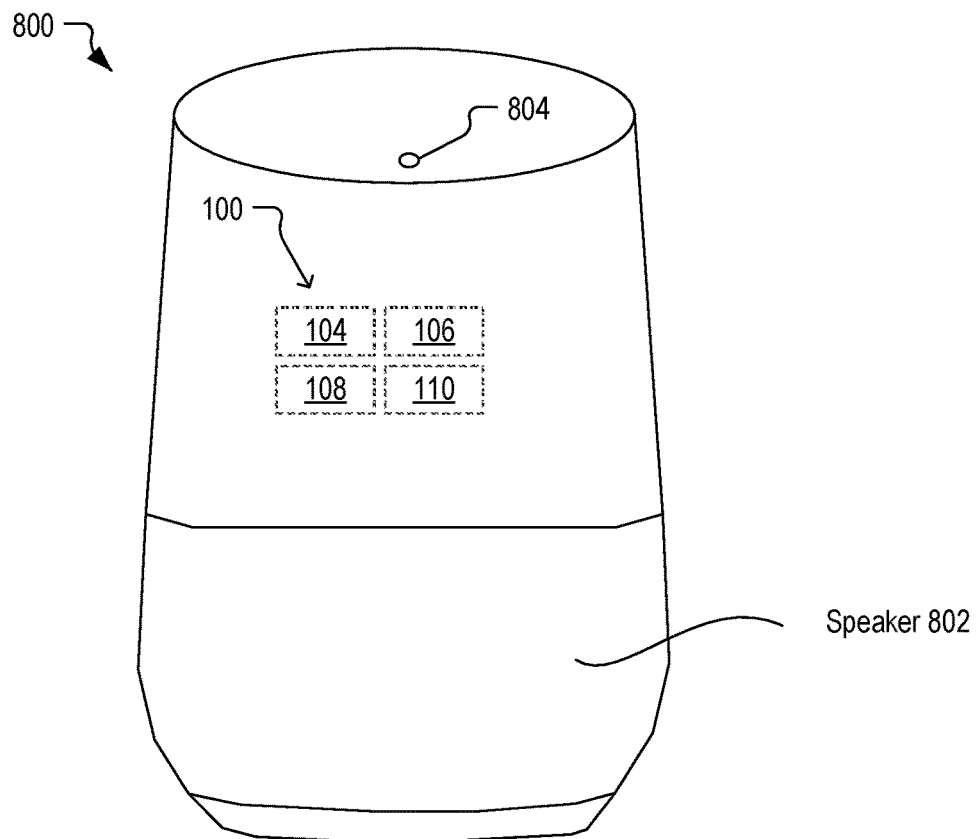
FIG. 8 illustrates a voice-controlled speaker system that incorporates aspects of the updated sound event detection model of FIG. 1, FIG. 3, or FIG. 4.

FIG. 8 is an illustrative example of a voice-controlled speaker system 800. The voice-controlled speaker system 800 can have wireless network connectivity and is configured to execute an assistant operation. In FIG. 8, the device 100 is included in the voice-controlled speaker system 800. The voice-controlled speaker system 800 also includes a speaker 802 and sensor(s) 804. The sensor(s) 804 can include one or more microphone(s) 114 of FIG. 1 to receive voice input or other audio input.

During operation, in response to receiving a verbal command, the voice-controlled speaker system 800 can execute assistant operations. The assistant operations can include adjusting a temperature, playing music, turning on lights, etc. The sensor(s) 804 enable detection of audio data, which the device 100 uses to detect sound events or to generate the update model 106. Additionally, the voice-controlled speaker system 800 can execute some operations based on sound events recognized by the device 100. For example, if the device 100 recognizes the sound of a door closing, the voice-controlled speaker system 800 can turn on one or more lights.

In the example illustrated in FIG. 8, the device 100 includes the base model 104, the update model 106, the SED engine 108, and the model updater 110. However, in other implementations, the device 100, when installed in or used in the voice-controlled speaker system 800, omits the model updater 110. To illustrate, the remote computing device 150 of FIG. 1 may generate the update model 106. In such implementations, the update model 106 can be downloaded to the voice-controlled speaker system 800 for used by the SED engine 108.

Figure 9:
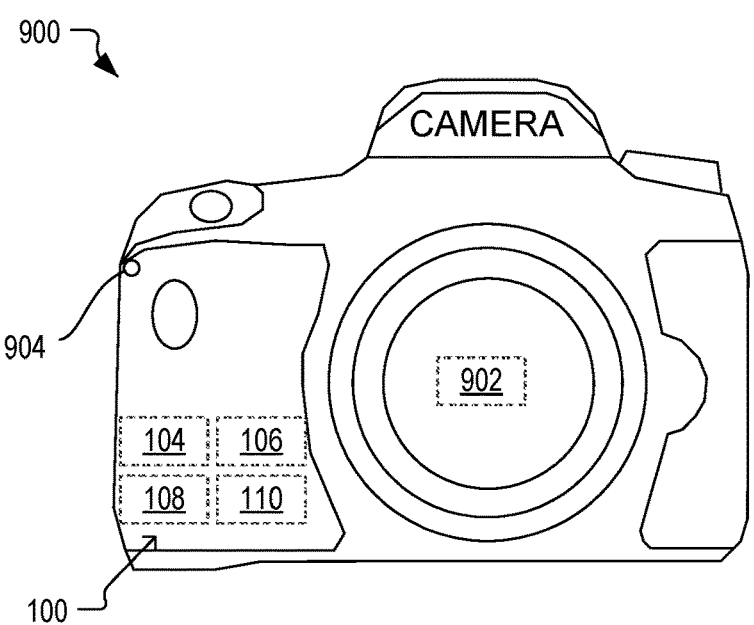
FIG. 9 illustrates a camera that incorporates aspects of the updated sound event detection model of FIG. 1, FIG. 3, or FIG. 4.

FIG. 9 illustrates a camera 900 that incorporates aspects of the updated sound event detection model of FIG. 1, FIG. 3, or FIG. 4. In FIG. 9, the device 100 is incorporated in or coupled to the camera 900. The camera 900 includes an image sensor 902 and one or more other sensors 904, such as the microphone(s)114 of FIG. 1. Additionally, the camera 900 includes the device 100, which is configured to identify sound events based on audio data from the sensor(s) 904. For example, the camera 900 may cause the image sensor 902 to capture an image in response to the device 100 detecting a particular sound event in the audio data from the sensor(s) 904.

In the example illustrated in FIG. 9, the device 100 includes the base model 104, the update model 106, the SED engine 108, and the model updater 110. However, in other implementations, the device 100, when installed in or used in the camera 900, omits the model updater 110. To illustrate, the remote computing device 150 of FIG. 1 may generate the update model 106. In such implementations, the update model 106 can be downloaded to the camera 900 for used by the SED engine 108.

Figure 10:
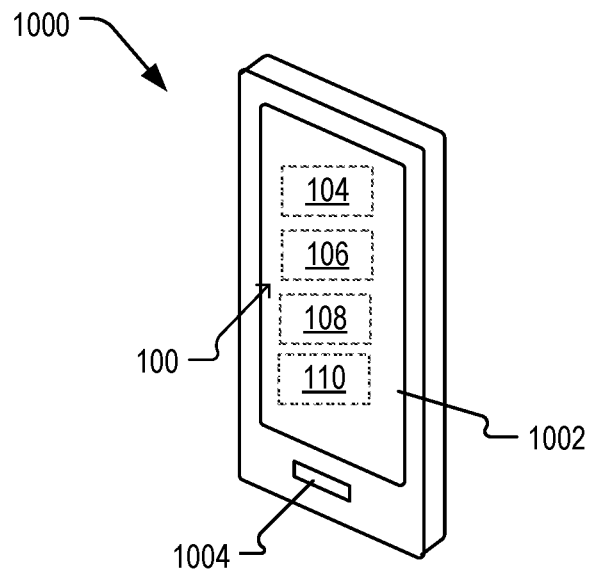
FIG. 10 illustrates a mobile device that incorporates aspects of the updated sound event detection model of FIG. 1, FIG. 3, or FIG. 4.

FIG. 10 illustrates a mobile device 1000 that incorporates aspects of the updated sound event detection model of FIG. 1, FIG. 3, or FIG. 4. In FIG. 10, the mobile device 1000 includes or is coupled to the device 100 of FIG. 1. The mobile device 1000 includes a phone or tablet, as illustrative, non-limiting examples. The mobile device 1000 includes a display screen 1002 and one or more sensors 1004, such as the microphone(s) 114 of FIG. 1.

During operation, the mobile device 1000 may perform particular actions in response to the device 100 detecting particular sound events. For example, the actions can include sending commands to other devices, such as a thermostat, a home automation system, another mobile device, etc. The sensor(s) 1004 enable detection of audio data, which the device 100 uses to detect sound events or to generate the update model 106.

In the example illustrated in FIG. 10, the device 100 includes the base model 104, the update model 106, the SED engine 108, and the model updater 110. However, in other implementations, the device 100, when installed in or used in the mobile device 1000, omits the model updater 110. To illustrate, the remote computing device 150 of FIG. 1 may generate the update model 106. In such implementations, the update model 106 can be downloaded to the mobile device 1000 for used by the SED engine 108.

Figure 11:
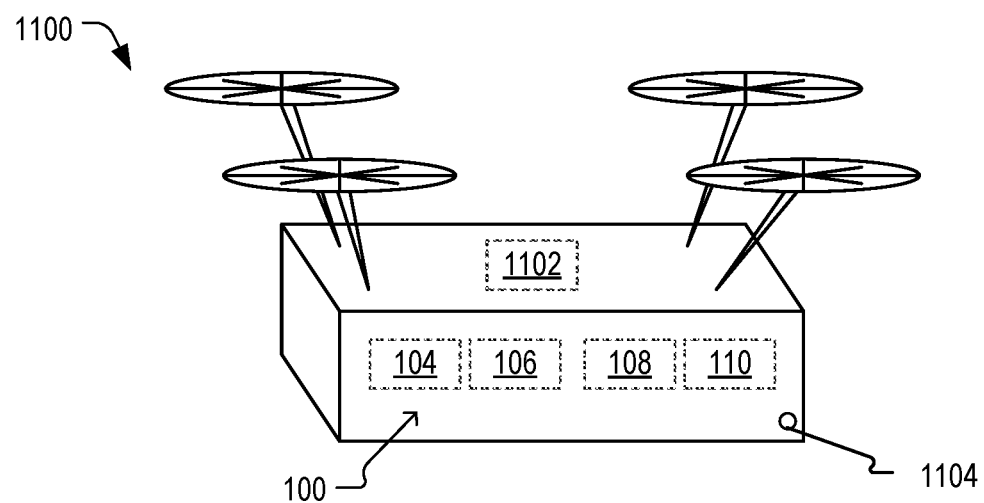
FIG. 11 illustrates an aerial device that incorporates aspects of the updated sound event detection model of FIG. 1, FIG. 3, or FIG. 4.

FIG. 11 illustrates an aerial device 1100 that incorporates aspects of the updated sound event detection model of FIG. 1, FIG. 3, or FIG. 4. In FIG. 11, the aerial device 1100 includes or is coupled to the device 100 of FIG. 1. The aerial device 1100 is a manned, unmanned, or remotely piloted aerial device (e.g., a package delivery drone). The aerial device 1100 includes a control system 1102 and one or more sensors 1104, such as the microphone(s) 114 of FIG. 1. The control system 1102 controls various operations of the aerial device 1100, such as cargo release, sensor activation, takeoff, navigation, landing, or combinations thereof. For example, the control system 1102 may control fly the aerial device 1100 between specified points and deployment of cargo at a particular location. In a particular aspect, the control system 1102 performs one or more action responsive to detection of a particular sound event by the device 100. To illustrate, the control system 1102 may initiate a safe landing protocol in response to the device 100 detecting an aircraft engine.

In the example illustrated in FIG. 11, the device 100 includes the base model 104, the update model 106, the SED engine 108, and the model updater 110. However, in other implementations, the device 100, when installed in or used in the aerial device 1100, omits the model updater 110. To illustrate, the remote computing device 150 of FIG. 1 may generate the update model 106. In such implementations, the update model 106 can be downloaded to the aerial device 1100 for used by the SED engine 108.

Figure 12:
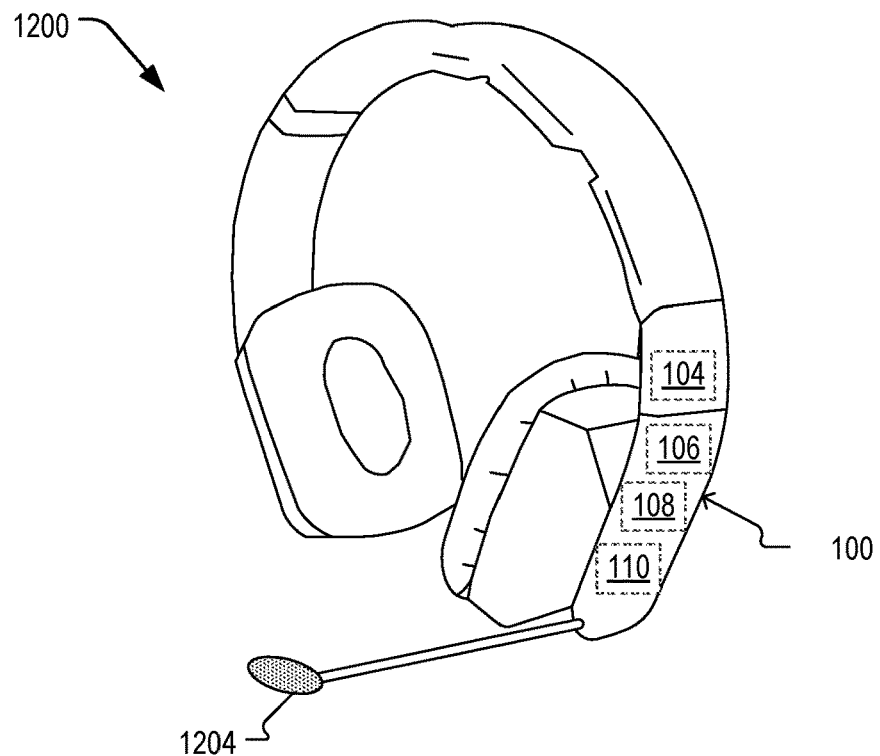
FIG. 12 illustrates a headset that incorporates aspects of the updated sound event detection model of FIG. 1, FIG. 3, or FIG. 4.

FIG. 12 illustrates a headset 1200 that incorporates aspects of the updated sound event detection model of FIG. 1, FIG. 3, or FIG. 4. In FIG. 12, the headset 1200 includes or is coupled to the device 100 of FIG. 1. The headset 1200 includes a microphone 1204 (e.g., one of the microphone(s) 114 of FIG. 1) positioned to primarily capture speech of a user. The headset 1200 may also include one or more additional microphone positioned to primarily capture environmental sounds (e.g., for noise canceling operations). In a particular aspect, the headset 1200 performs one or more actions responsive to detection of a particular sound event by the device 100. To illustrate, the headset 1200 may activate a noise cancellation feature in response to the device 100 detecting a gunshot.

In the example illustrated in FIG. 12, the device 100 includes the base model 104, the update model 106, the SED engine 108, and the model updater 110. However, in other implementations, the device 100, when installed in or used in the headset 1200, omits the model updater 110. To illustrate, the remote computing device 150 of FIG. 1 may generate the update model 106. In such implementations, the update model 106 can be downloaded to the headset 1200 for used by the SED engine 108.

Figure 13:
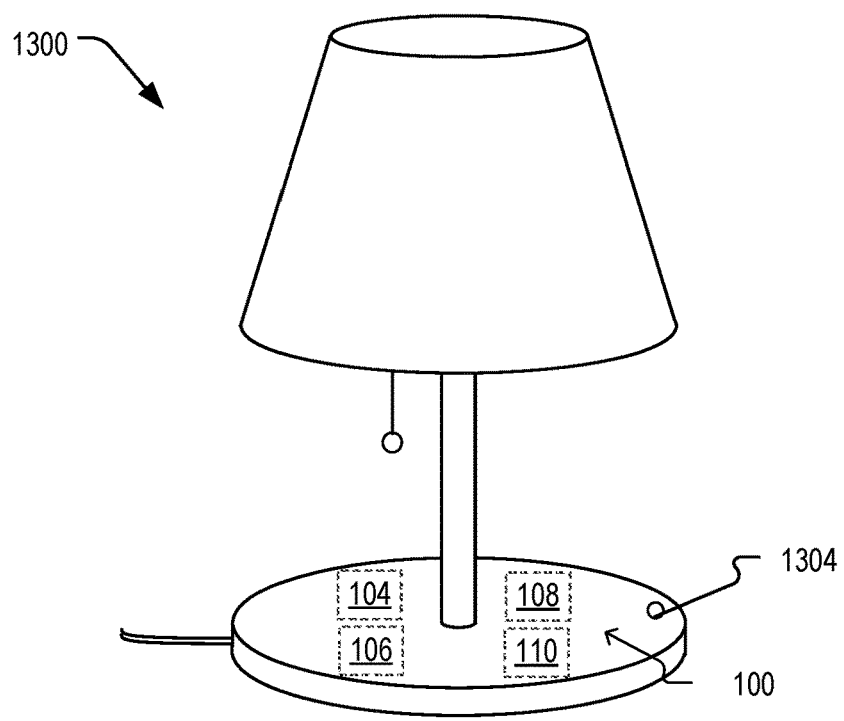
FIG. 13 illustrates an appliance that incorporates aspects of the updated sound event detection model of FIG. 1, FIG. 3, or FIG. 4.

FIG. 13 illustrates an appliance 1300 that incorporates aspects of the updated sound event detection model of FIG. 1, FIG. 3, or FIG. 4. In FIG. 13, the appliance 1300 is a lamp; however, in other implementations, the appliance 1300 includes another Internet-of-Things appliance, such as a refrigerator, a coffee maker, an oven, another household appliance, etc. The appliance 1300 includes or is coupled to the device 100 of FIG. 1. The appliance 1300 includes one or more sensors 1304, such as the microphone(s) 114 of FIG. 1. In a particular aspect, the appliance 1300 performs one or more actions responsive to detection of a particular sound event by the device 100. To illustrate, the appliance 1300 may activate a light in response to the device 100 detecting a door closing.

In the example illustrated in FIG. 13, the device 100 includes the base model 104, the update model 106, the SED engine 108, and the model updater 110. However, in other implementations, the device 100, when installed in or used in the appliance 1300, omits the model updater 110. To illustrate, the remote computing device 150 of FIG. 1 may generate the update model 106. In such implementations, the update model 106 can be downloaded to the appliance 1300 for used by the SED engine 108.

Figure 14:
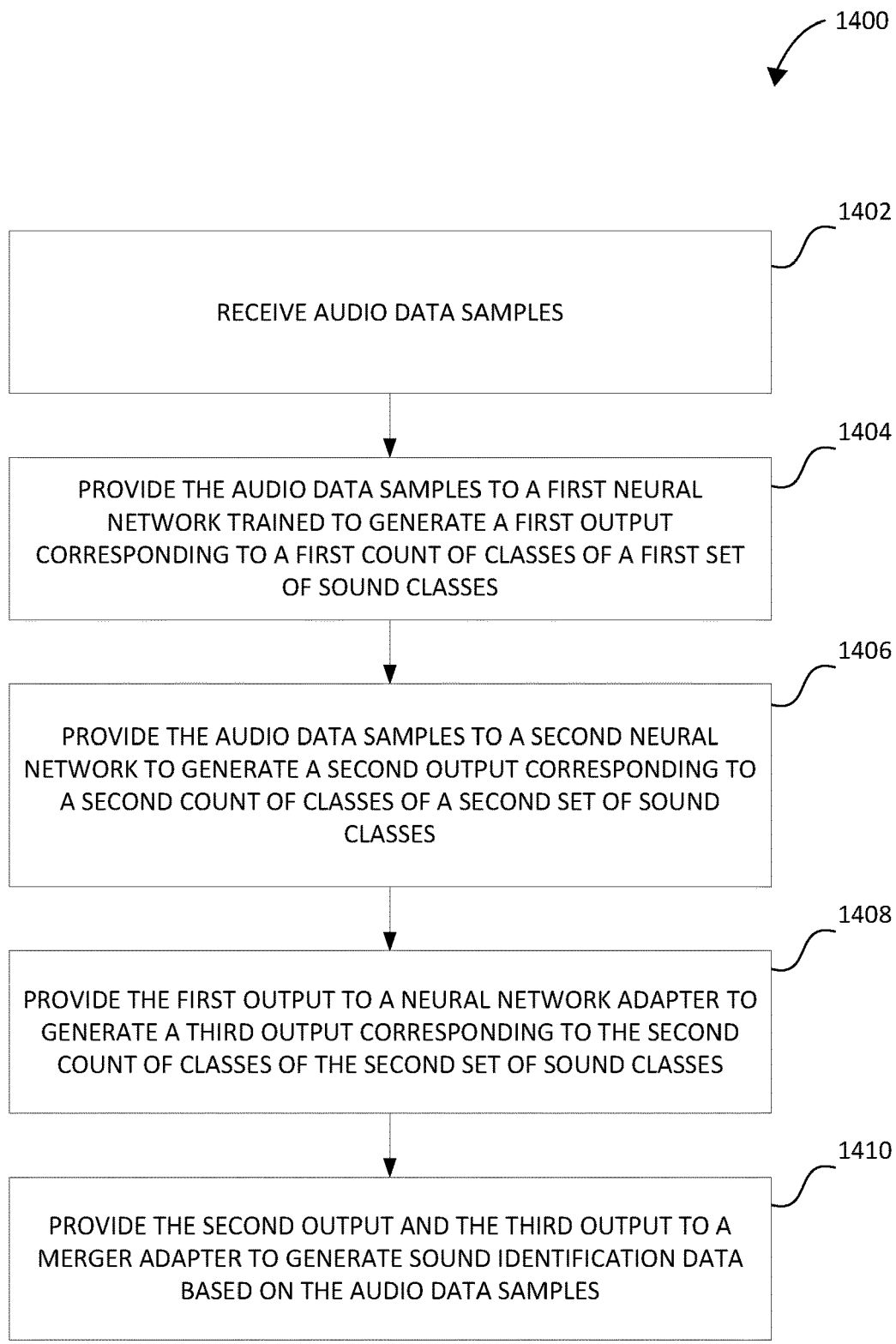
FIG. 14 is a flow chart illustrating an example of a method of generating sound event detection data using the updated sound event detection model of FIG. 1, FIG. 3, or FIG. 4.

FIG. 14 is a flow chart illustrating an example of a method 1400 of generating sound event detection data using an updated sound event detection model (e.g., the update model 106) of FIG. 1, FIG. 3, or FIG. 4. The method 1400 can be initiated, controlled, or performed by the device 100. For example, the processor(s) 120 or 132 of FIG. 1 can execute instructions 124 from the memory 130 to cause the SED engine 108 to use the update model 106 to generate the output data 408 based on audio data samples corresponding to captured audio.

In block 1402, the method 1400 includes receiving audio data samples. For example, the microphone(s) 114 of the device 100 can receive the audio data from an acoustic environment proximate the microphone(s) 114, and the CODEC 142 or the SED engine 108 can generate the audio data samples based on the audio data.

In block 1404, the method 1400 includes providing the audio data samples to a first neural network trained to generate a first output corresponding to a first count of classes of a first set of sound classes. For example, as illustrated in FIG. 4, the audio data samples 406 are provided (as one or more inputs 450) to the base model 104. In this example, the base model 104 includes N nodes in the output layer 234, where N is an integer corresponding to the count of the set of sound classes that the base model 104 is configured to detect. The output layer 234 generates the first output 452, which including one data element per node of the output layer 234 (e.g., N data elements).

In block 1406, the method 1400 includes providing the audio data samples to a second neural network to generate a second output corresponding to a second count of classes of a second set of sound classes, where the second count of classes is greater than the first count of classes. For example, as illustrated in FIG. 4, the audio data samples 406 are provided to the incremental model 302. In this example, the output layer 322 of the incremental model 302 includes N+K nodes, where K is an integer greater than or equal to one and corresponds to the count of sound classes that the update model 106 can detect that are not detected by the base model 104. Thus, N+K is greater than N. The output layer 322 generates an output including one data element per node of the output layer 322 (e.g., N+K data elements).

In block 1408, the method 1400 includes providing the first output to a neural adapter to generate a third output corresponding to the second count of classes of the second set of sound classes. For example, the base model 104 of FIG. 4 provides an output to the neural adapter 310. The neural adapter 310 generates an output that has the same number of data elements as the output of the incremental model 302 (e.g., N+K data elements).

In block 1410, the method 1400 includes providing the second output and the third output to a merger adapter to generate sound identification data based on the audio data samples. For example, in FIG. 4, the neural adapter 310 generates the third output 456 and the incremental model 302 generates the second output 454. In this example, the third output 456 and the second output 454 are each provided the merger adapter 308. The aggregation layer 316 of the merger adapter 308 combines the outputs 454 and 456 to generate a merged output 458, and the output layer 320 of the merger adapter 308 generates the output data 408 based on the merged output 458. The output data 408 includes an indication of a recognized sound event (e.g., the sound event identification data 460).

Figure 15:
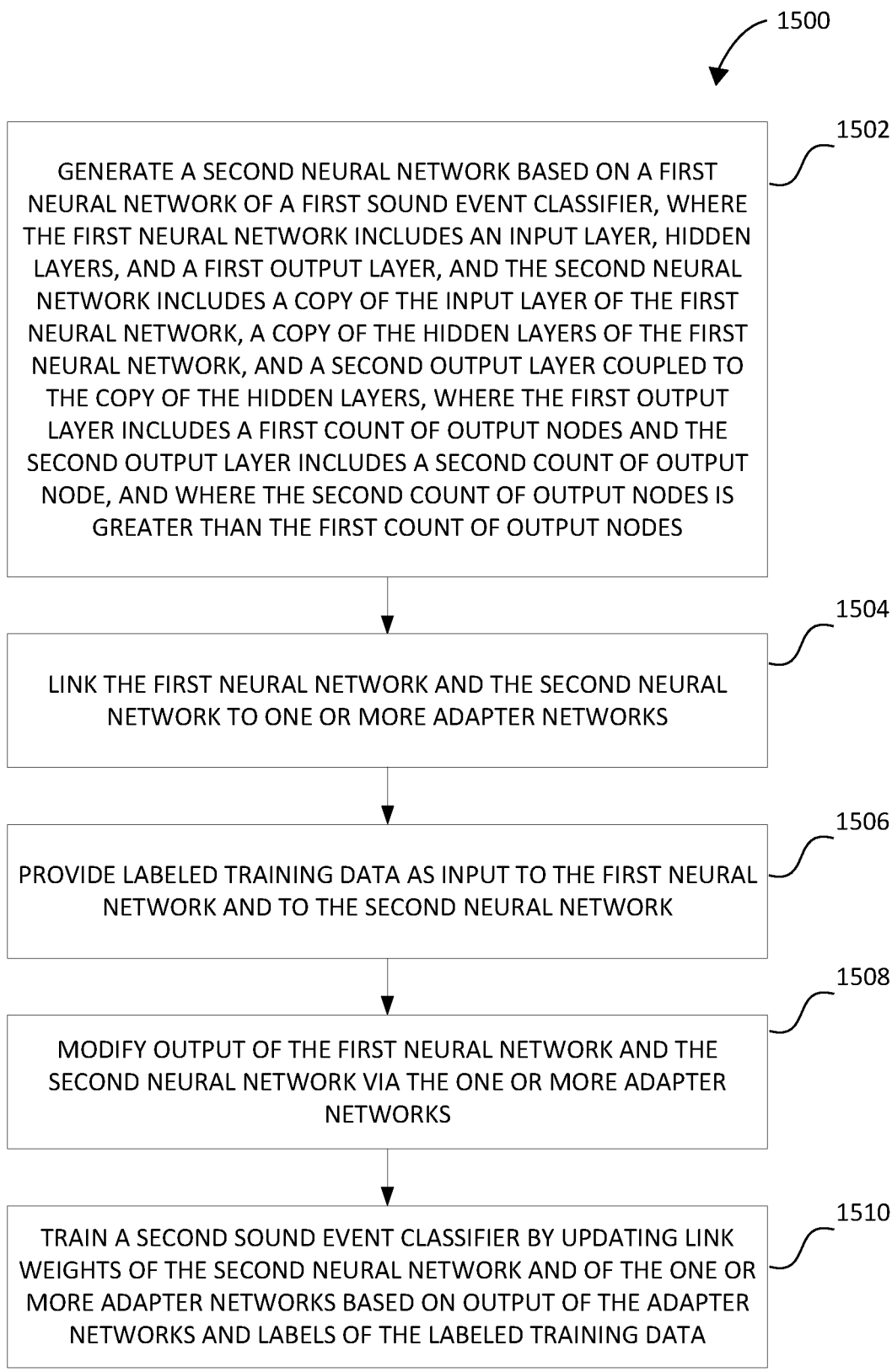
FIG. 15 is a flow chart illustrating an example of a method of generating the updated sound event detection model of FIG. 1, FIG. 3, or FIG. 4.

FIG. 15 is a flow chart illustrating an example of a method 1500 of generating the updated sound event detection model of FIG. 1, FIG. 3, or FIG. 4. The method 1500 can be initiated, controlled, or performed by the device 100. For example, the processor(s) 120 or 132 of FIG. 1 can execute instructions 124 from the memory 130 to cause the model updater 110 to generate the update model 106 based on the audio data samples 126 and 128. Alternatively, in a particular aspect, the method 1500 can be initiated, controlled, or performed by the remote computing device 150 of FIG. 1. To illustrate, the model updater 110 may be executed at the remote computing device 150 using audio data samples 126 from the base training data 152 and audio data samples 128 sent to the remote computing device 150 from the device 100.

In block 1502, the method 1500 includes generating a second neural network based on a first neural network of a first sound event classifier. The first neural network includes an input layer, hidden layers, and a first output layer, and the second neural network includes a copy of the input layer of the first neural network, a copy of the hidden layers of the first neural network, and a second output layer coupled to the copy of the hidden layers. The first output layer includes a first count of output nodes and the second output layer includes a second count of output node, where the second count of output nodes is greater than the first count of output nodes. For example, the model updater 110 generates the incremental model 302 by duplicating (e.g., copying) the base model 104, which includes the input layer 204, the hidden layers 206, and the output layer 234, and replacing or modifying the output layer 234 with the output layer 322. In this example, the base model 104 is a first neural network that is trained to generate sound identification data in response to input of audio data samples representing one or more of a first set of sound classes, and the output layer 234 of the base model 104 includes a count of nodes (e.g., N nodes) corresponding to a number of classes of the first set of sound classes. Further, the incremental model 302 is a second neural network that is to be trained to generate sound identification data in response to input of audio data samples representing one or more of a second set of sound classes and the output layer 322 of the incremental model 302 includes a second count of nodes (e.g., N+K) corresponding to a second number of classes of the second set of sound classes. The second set of count classes includes the first set of sound classes and one or more additional sound classes.

In block 1504, the method 1500 includes linking the first neural network and the second neural network to one or more adapter networks. For example, the model updater 110 of FIG. 1 generates the adapter network(s) 314, and links outputs of the base model 104 (e.g., the first neural network) and the incremental model 302 (e.g., the second neural network) to the adapter network(s) 314.

In block 1506, the method 1500 includes providing labeled training data as input to the first neural network and to the second neural network. For example, in FIG. 3, the model updater 110 provides the labeled training data 304 as one or more inputs 350 to the base model 104 and to the incremental model 302.

In block 1508, the method 1500 includes modifying output of the first neural network and the second neural network via the one or more adapter networks. For example, in response to the labeled training data 304, the base model 104 and the incremental model 302 of FIG. 3 each provide output to the adapter network(s) 314. To illustrate, the base model 104 provides the first output(s) 352 to the neural adapter 310, and the neural adapter generates the third output(s) 356 based on the first output(s) 352. Additionally, the incremental model 302 generates the second output(s) 354. The third output(s) 356 and the second output(s) 354 are provided to the merger adapter 308, and the merger adapter 308 generates the output data 318.

In block 1510, the method 1500 training a second sound event classifier by updating link weights of the second neural network and of the one or more adapter networks based on output of the adapter networks and labels of the labeled training data. For example, the model updater 110 trains the update model 106 by determining the updated link weights 362 (e.g., using gradient descent or another optimization search process) and providing the updated link weights 362 to one or more of the incremental model 302, the neural adapter 310, and the merger adapter 308. In this example, the base link weights 238 of the base model 104 are not changed.

In conjunction with the described implementations, an apparatus includes means for storing a sound event classifier trained to generate first sound identification data in response to input of audio data representing one or more of a first set of sound classes. For example, the means for storing includes the remote computing device 150, the device 100, the memory 130, the processor 120, the processor(s) 132, one or more other circuits or components configured to store a trained sound event classifier (e.g., a neural network), or any combination thereof.

The apparatus also includes means for generating an updated sound event classifier trained to generate second sound identification data in response to input of audio data samples representing one or more of a second set of sound classes, where the second set of count classes includes the first set of sound classes and one or more additional sound classes. For example, the means for generating the updated sound event classifier includes the remote computing device 150, the device 100, the instructions 124, the processor 120, the processor(s) 132, the model updater 110, one or more other circuits or components configured to generate an updated sound event classifier trained to generate second sound identification data in response to input of audio data representing one or more of a second set of sound classes, where the second set of count classes includes the first set of sound classes and one or more additional sound classes, or any combination thereof.

In conjunction with the described implementations, an apparatus includes means for generating a first output corresponding to a first count of classes of a first set of sound classes. For example, the means generating a first output includes the processor 120, the processor(s) 132, the base model 104, the update model 106, the SED engine 108, one or more other circuits or components configured to generate a first output corresponding to a first count of classes of a first set of sound classes, or any combination thereof.

The apparatus also includes means for generating a second output corresponding to a second count of classes of a second set of sound classes, the second count of classes greater than the first count of classes. For example, the means for generating a second output includes the processor 120, the processor(s) 132, the incremental model 302, the update model 106, the SED engine 108, one or more other circuits or components configured to generate a second output corresponding to a second count of classes of a second set of sound classes, or any combination thereof.

The apparatus also includes means for generating a third output based on the first output, the third output corresponding to the second count of classes of the second set of sound classes. For example, the means for generating a third output includes the processor 120, the processor(s) 132, the update model 106, the adapter network(s) 314, the neural adapter 310, the SED engine 108, one or more other circuits or components configured to generate a third output based on the first output, or any combination thereof.

The apparatus also includes means for generating sound event identification data based on the third output and the second output. For example, the means for generating sound identification data based on the third output and the second output includes the processor 120, the processor(s) 132, the update model 106, the adapter network(s) 314, the merger adapter 308, the SED engine 108, one or more other circuits or components configured to generate sound identification data based on the third output and the second output, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Particular aspects of the disclosure are described below in a first set of interrelated clauses:

According to Clause 1, a device includes a processor configured to receive audio data samples; provide the audio data samples to a first neural network trained to generate a first output corresponding to a first count of classes of a first set of sound classes; provide the audio data samples to a second neural network to generate a second output corresponding to a second count of classes of a second set of sound classes, the second count of classes greater than the first count of classes; provide the first output to a neural adapter to generate a third output corresponding to the second count of classes of the second set of sound classes; and provide the second output and the third output to a merger adapter to generate sound event identification data based on the audio data samples.

Clause 2 includes the device of Clause 1 wherein the first neural network has a base topology and a first output layer and the second neural network has the base topology and a second output layer, and wherein the first output layer includes a first count of nodes, the second output layer includes a second count of nodes, and the second count of nodes is greater than the first count of nodes.

Clause 3 includes the device of Clause 2 wherein the neural adapter has an input layer including the first count of nodes and an output layer including the second count of nodes.

Clause 4 includes the device of any of Clauses 1 to 3 wherein the merger adapter is configured to merge the second output and the third output, element-by-element, to form a merged output.

Clause 5 includes the device of Clause 4 wherein the merger adapter is configured to generate output data including the sound event identification data based on the merged output.

Clause 6 includes the device of any of Clauses 1 to 5 wherein the audio data samples include features extracted from audio data.

Clause 7 includes the device of any of Clauses 1 to 6 wherein the audio data samples include Mel spectrum features extracted from audio data.

Clause 8 includes the device any of Clauses 1 to 7 and further includes one or more microphones coupled to the processor and configured to capture audio data to generate the audio data samples.

Clause 9 includes the device of Clause 8 wherein the processor and the one or more microphones are integrated within a mobile computing device and the audio data represents an acoustic environment of the mobile computing device.

Clause 10 includes the device of Clause 8 wherein the processor and the one or more microphones are integrated within a vehicle.

Clause 11 includes the device of Clause 8 wherein the processor and the one or more microphones are integrated within a wearable device and the audio data represents an acoustic environment of the wearable device.

Clause 12 includes the device of Clause 8 wherein the processor and the one or more microphones are integrated within a headset.

Clause 13 includes the device of Clause 8 wherein the processor is included in an integrated circuit.

Particular aspects of the disclosure are described below in a second set of interrelated clauses:

According to Clause 14, a method includes receiving audio data samples; providing, by a processor, the audio data samples to a first neural network trained to generate a first output corresponding to a first count of classes of a first set of sound classes; providing, by the processor, the audio data samples to a second neural network to generate a second output corresponding to a second count of classes of a second set of sound classes, the second count of classes greater than the first count of classes; providing, by the processor, the first output to a neural adapter to generate a third output corresponding to the second count of classes of the second set of sound classes; and providing, by the processor, the second output and the third output to a merger adapter to generate sound event identification data based on the audio data samples.

Clause 15 includes the method of Clause 14 wherein the first neural network has a base topology and a first output layer and the second neural network has the base topology and a second output layer, and wherein the first output layer includes a first count of nodes, the second output layer includes a second count of nodes, and the second count of nodes is greater than the first count of nodes.

Clause 16 includes the method of Clause 15 wherein the neural adapter has an input layer including the first count of nodes and an output layer including the second count of nodes.

Clause 17 includes the method of any of Clauses 14 to 16 wherein the merger adapter merges the second output and the third output, element-by-element, to form a merged output.

Clause 18 includes the method of Clause 17 wherein merger adapter generates output data including the sound event identification data based on the merged output.

Clause 19 includes the method of any of Clauses 14 to 18 and further includes generating the audio data samples by extracting features from the audio data representing an acoustic environment.

Clause 20 includes the method of any of Clauses 14 to 19 and further includes capturing audio data at one or more microphones coupled to the processor, wherein the audio data samples are generated based on the captured audio data.

Clause 21 includes the method of any of Clauses 14 to 20 and further includes performing an action responsive to the sound event identification data.

Particular aspects of the disclosure are described below in a third set of interrelated clauses:

According to Clause 22, a non-transitory computer-readable storage medium includes instructions that when executed by a processor, cause the processor to provide audio data samples to a first neural network trained to generate a first output corresponding to a first count of classes of a first set of sound classes; provide the audio data samples to a second neural network to generate a second output corresponding to a second count of classes of a second set of sound classes, the second count of classes greater than the first count of classes; provide the first output to a neural adapter to generate a third corresponding to the second count of classes of the second set of sound classes; and provide the second output and the third output to a merger adapter to generate sound event identification data based on the audio data samples.

Clause 23 includes the non-transitory computer-readable storage medium of Clause 22 wherein the first neural network has a base topology and a first output layer and the second neural network has the base topology and a second output layer, and wherein the first output layer includes a first count of nodes, the second output layer includes a second count of nodes, and the second count of nodes is greater than the first count of nodes.

Clause 24 includes the non-transitory computer-readable storage medium of Clause 22 or Clause 23 wherein the instructions when executed by the processor further cause the processor to perform an action responsive to the sound event identification data.

Clause 25 includes the non-transitory computer-readable storage medium of any of Clauses 22 to 24 wherein the merger adapter generates the sound event identification data based on merged output based on element-by-element merger of the third output and the second output.

Particular aspects of the disclosure are described below in a fourth set of interrelated clauses:

According to Clause 26, a device includes means for generating a first output based on audio data samples, the first output having a first count of data elements corresponding to a first count of classes of a first set of sound classes; means for generating a second output based on the audio data samples, the second output corresponding to a second count of classes of a second set of sound classes, the second count of classes greater than the first count of classes; means for generating a third output based on the first output, the third output corresponding to the second count of classes of the second set of sound classes; and means for generating sound event identification data based on the third output and the second output.

Clause 27 includes the device of Clause 26 wherein the means for generating the third output based on the first output comprises an input layer including a first count of nodes and an output layer including a second count of nodes, and wherein the first count of nodes corresponds to the first count of classes, and the second count of nodes corresponds to the second count of classes.

Clause 28 includes the device of Clause 26 or Clause 27 wherein the means for generating the sound event identification data based on the third output and the second output is configured to merge the second output and the third output, element-by-element, to form a merged output.

Clause 29 includes the device of any of Clauses 26 to 28 wherein the means for generating the sound event identification data based on the third output and the second output is configured to generate output data including the sound event identification data based on a merged output formed from the third output and the second output.

Clause 30 includes the device of any of Clauses 26 to 29 further comprising means for capturing audio data, wherein the audio data samples include features extracted from the audio data.

Particular aspects of the disclosure are described below in a fifth set of interrelated clauses:

According to Clause 31, a device includes a memory storing a sound event classifier trained to generate first sound identification data in response to input of audio data representing one or more of a first set of sound classes. The device also includes a processor coupled to the memory and configured to generate an updated sound event classifier trained to generate second sound identification data in response to input of audio data representing one or more of a second set of sound classes, the second set of sound classes including the first set of sound classes and one or more additional sound classes. The updated sound event classifier includes the sound event classifier, a second sound event classifier, a neural adapter, and a merger adapter. The neural adapter includes one or more adapter layers configured to receive an input having a count of data elements corresponding to an output layer of the sound event classifier and configured to generate an output having a second count of data elements corresponding to an output layer of the second sound event classifier. The merger adapter includes one or more aggregation layers configured to merge the output from the neural adapter and an output of the second sound event classifier and including an output layer to generate the second sound identification data.

Clause 32 includes the device of Clause 31 and further includes one or more microphones coupled to the processor and configured to receive audio data corresponding to the additional sound classes.

Clause 33 includes the device of Clause 31 or Clause 32 and further includes one or more input devices coupled to the processor and configured to receive label data associated with the additional sound classes.

Clause 34 includes the device of any of Clauses 31 to 33 wherein the memory stores instructions corresponding to a model updater, and wherein the model updater is executable by the processor to generate the updated sound event classifier based on the sound event classifier, the first set of sound classes, and the additional sound classes.

Clause 35 includes the device of any of Clauses 31 to 34 wherein the processor and the memory are integrated within a mobile computing device.

Clause 36 includes the device of Clauses 31 to 34 wherein the processor and the memory are integrated within a vehicle.

Clause 37 includes the device of Clauses 31 to 34 wherein the processor and the memory are integrated within wearable device.

Clause 38 includes the device of Clauses 31 to 34 wherein the processor and the memory are integrated within an augmented reality headset, a mixed reality headset, or a virtual reality headset.

Clause 39 includes the device of Clauses 31 to 38 wherein the processor is included in an integrated circuit.

Clause 40 includes the device of Clauses 31 to 39 and further includes one or more output devices coupled to the processor and configured to generate a sound classification output based on the second sound identification data.

Particular aspects of the disclosure are described below in a sixth set of interrelated clauses:

According to Clause 41, a device includes means for storing a sound event classifier trained to generate first sound identification data in response to input of audio data representing one or more of a first set of sound classes, and includes means for generating an updated sound event classifier trained to generate second sound identification data in response to input of audio data representing one or more of a second set of sound classes; the second set of sound classes including the first set of sound classes and one or more additional sound classes. The updated sound event classifier includes the sound event classifier, a second sound event classifier, a neural adapter, and a merger adapter. The neural adapter includes one or more adapter layers configured to receive an input having a count of data elements corresponding to an output layer of the sound event classifier and configured to generate an output having a second count of data elements corresponding to an output layer of the second sound event classifier. The merger adapter includes one or more aggregation layers configured to merge the output from the neural adapter and an output of the second sound event classifier and including an output layer to generate the second sound identification data.

Clause 42 includes the device of Clause 41 and further includes means for receiving audio data corresponding to the additional sound classes.

Clause 43 includes the device of Clause 41 or Clause 42 and further includes means for receiving label data associated with the additional sound classes.

Clause 44 includes the device of any of Clauses 41 to 43 wherein the means for storing and the means for generating are integrated within a mobile computing device.

Clause 45 includes the device of any of Clauses 41 to 43 wherein the means for storing and the means for generating are integrated within a vehicle.

Clause 46 includes the device of any of Clauses 41 to 43 wherein the means for storing and the means for generating are integrated within wearable device.

Clause 47 includes the device of any of Clauses 41 to 43 wherein the means for storing and the means for generating are integrated within an augmented reality or virtual reality headset.

Particular aspects of the disclosure are described below in a seventh set of interrelated clauses:

According to Clause 48, a method includes generating a second neural network based on a first neural network of a first sound event classifier, wherein the first neural network includes an input layer, hidden layers, and a first output layer, and the second neural network includes a copy of the input layer of the first neural network, a copy of the hidden layers of the first neural network, and a second output layer coupled to the copy of the hidden layers. The first output layer includes a first count of output nodes and the second output layer includes a second count of output nodes, wherein the second count of output nodes is greater than the first count of output nodes. The method also includes linking the first neural network and the second neural network to one or more adapter networks; providing labeled training data as input to the first neural network and to the second neural network; modifying output of the first neural network and the second neural network via the one or more adapter networks; and training a second sound event classifier by updating link weights of the second neural network and of the one or more adapter networks based on output of the adapter networks and labels of the labeled training data.

Clause 49 includes the method of Clause 48 wherein the first count of output nodes corresponds to a first set of sound classes that the first sound event classifier is trained to detect and the second count of output nodes corresponds to a second set of sound classes that the second sound event classifier is trained to detect, and wherein the second set of sound classes includes the first set of sound classes and one or more additional sound classes.

Clause 50 includes the method of Clause 49 and further includes capturing, by a microphone of a mobile device, audio data representing a sound event of the one or more additional sound classes, wherein a processor of the mobile device trains the second sound event classifier based in part on audio data samples representing the audio data captured by the microphone of the mobile device.

Clause 51 includes the method of Clause 49 or Clause 50 wherein the labeled training data includes one or more audio data samples representing each class of the first set of sound classes and one or more audio data samples representing each class of the one or more additional sound classes.

Clause 52 includes the method of any of Clauses 48 to 51 wherein the adapter networks include a neural adapter including one or more adapter layers configured to receive an input having a first count of data elements and configured to generate an output having a second count of data elements, the first count of data elements corresponding to the first count of output nodes and the second count of data elements corresponding to the second count of output nodes.

Clause 53 includes the method of Clause 52 wherein the adapter networks include a merger adapter including one or more aggregation layers and an output layer, wherein the one or more aggregation layers are configured to merge the output from the neural adapter and an output of the second neural network, and wherein the output layer is configured to generate output data identifying a sound event.

Clause 54 includes the method of any of Clauses 48 to 53 and further including, after training the second sound event classifier, proving audio data samples as input to the second sound event classifier and generating output data identifying a sound event detected in the audio data samples by the second sound event classifier.

Clause 55 includes the method of Clause 54 wherein generating the output data identifying the sound event includes providing the audio data samples to the first neural network to generate a first output; providing the audio data samples to the second neural network to generate a second output; providing the first output to a neural adapter of the one or more adapter networks to generate a third output; and providing the second output and the third output to a merger adapter of the one or more adapter networks to generate the output data.

Clause 56 includes the method of any of Clauses 48 to 55 wherein link weights of the first neural network are not updated during the training of the second sound event classifier.

Clause 57 includes the method of any of Clauses 48 to 56 wherein the second sound event classifier includes the first neural network, the second neural network, and the one or more adapter networks.

Particular aspects of the disclosure are described below in an eighth set of interrelated clauses:

According to Clause 58, a non-transitory computer-readable storage medium includes instructions that when executed by a processor, cause the processor to generate a second neural network based on a first neural network of a first sound event classifier, wherein the first neural network includes an input layer, hidden layers, and a first output layer, and the second neural network includes a copy of the input layer of the first neural network, a copy of the hidden layers of the first neural network, and a second output layer coupled to the copy of the hidden layers. The first output layer includes a first count of output nodes and the second output layer includes a second count of output node, wherein the second count of output nodes is greater than the first count of output nodes. The instructions further cause the processor to link the first neural network and the second neural network to one or more adapter networks; provide labeled training data as input to the first neural network and to the second neural network; modify output of the first neural network and the second neural network via the one or more adapter networks; and train a second sound event classifier by updating link weights of the second neural network and of the one or more adapter networks based on output of the adapter networks and labels of the labeled training data.

Clause 59 includes the non-transitory computer-readable storage medium of Clause 58 wherein the first sound event classifier is trained to detect a first set of sound classes and the second sound event classifier is trained to detect a second set of sound classes, the second set of sound classes including the first set of sound classes and one or more additional sound classes.

Clause 60 includes the non-transitory computer-readable storage medium of Clause 58 or Clause 59 wherein the instructions when executed by the processor further cause the processor to, after training the second sound event classifier, provide audio data samples representing capture audio data as input to the second sound event classifier and generate output data identifying a sound event detected in the audio data samples by the second sound event classifier.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a processor configured to:
receive audio data samples including a first audio data sample;
provide the audio data samples to a first neural network trained to generate a first output corresponding to a first count of classes of a first set of sound classes;
provide the audio data samples to a second neural network to generate a second output corresponding to a second count of classes of a second set of sound classes, the second count of classes greater than the first count of classes, the first output and the second output generated based on the first audio data sample;
provide the first output to a neural adapter to generate a third output corresponding to the second count of classes of the second set of sound classes; and
provide the second output and the third output to a merger adapter to generate sound event identification data based on the audio data samples.

2. The device of claim 1, wherein the first neural network has a base topology and a first output layer and the second neural network has the base topology and a second output layer, and wherein the first output layer includes a first count of nodes, the second output layer includes a second count of nodes, and the second count of nodes is greater than the first count of nodes.

3. The device of claim 2, wherein the neural adapter has an input layer including the first count of nodes and an output layer including the second count of nodes.

4. The device of claim 1, wherein the merger adapter is configured to merge the second output and the third output, element-by-element, to form a merged output.

5. The device of claim 4, wherein the merger adapter is configured to generate output data including the sound event identification data based on the merged output.

6. The device of claim 1, wherein the audio data samples include features extracted from audio data.

7. The device of claim 1, wherein the audio data samples include Mel spectrum features extracted from audio data.

8. The device of claim 1, further comprising one or more microphones coupled to the processor and configured to capture audio data to generate the audio data samples.

9. The device of claim 8, wherein the processor and the one or more microphones are integrated within a mobile computing device and the audio data represents an acoustic environment of the mobile computing device.

10. The device of claim 8, wherein the processor and the one or more microphones are integrated within a vehicle.

11. The device of claim 8, wherein the processor and the one or more microphones are integrated within a wearable device and the audio data represents an acoustic environment of the wearable device.

12. The device of claim 8, wherein the processor and the one or more microphones are integrated within a headset and the audio data represents an acoustic environment of the headset.

13. The device of claim 1, wherein the processor is included in an integrated circuit.

14. A method comprising:
receiving audio data samples including a first audio data sample;
providing, by a processor, the audio data samples to a first neural network trained to generate a first output corresponding to a first count of classes of a first set of sound classes;
providing, by the processor, the audio data samples to a second neural network to generate a second output corresponding to a second count of classes of a second set of sound classes, the second count of classes greater than the first count of classes, the first output and the second output generated based on the first audio data sample;
providing, by the processor, the first output to a neural adapter to generate a third output corresponding to the second count of classes of the second set of sound classes; and
providing, by the processor, the second output and the third output to a merger adapter to generate sound event identification data based on the audio data samples.

15. The method of claim 14, wherein the first neural network has a base topology and a first output layer and the second neural network has the base topology and a second output layer, and wherein the first output layer includes a first count of nodes, the second output layer includes a second count of nodes, and the second count of nodes is greater than the first count of nodes.

16. The method of claim 15, wherein the neural adapter has an input layer including the first count of nodes and an output layer including the second count of nodes.

17. The method of claim 14, wherein the merger adapter merges the second output and the third output, element-by-element, to form a merged output.

18. The method of claim 17, wherein the merger adapter generates output data including the sound event identification data based on the merged output.

19. The method of claim 14, further comprising generating the audio data samples including extracting features from audio data representing an acoustic environment.

20. The method of claim 14, further comprising capturing audio data at one or more microphones coupled to the processor, wherein the audio data samples are generated based on the captured audio data.

21. The method of claim 14, further comprising performing an action responsive to the sound event identification data.

22. A non-transitory computer-readable storage medium, the computer-readable storage medium including instructions that when executed by a processor, cause the processor to:
provide audio data samples to a first neural network trained to generate a first output corresponding to a first count of classes of a first set of sound classes, the audio data samples including a first audio data sample;
provide the audio data samples to a second neural network to generate a second output corresponding to a second count of classes of a second set of sound classes, the second count of classes greater than the first count of classes, the first output and the second output generated based on the first audio data sample;
provide the first output to a neural adapter to generate a third output corresponding to the second count of classes of the second set of sound classes; and
provide the second output and the third output to a merger adapter to generate sound event identification data based on the audio data samples.

23. The non-transitory computer-readable storage medium of claim 22, wherein the first neural network has a base topology and a first output layer and the second neural network has the base topology and a second output layer, and wherein the first output layer includes a first count of nodes, the second output layer includes a second count of nodes, and the second count of nodes is greater than the first count of nodes.

24. The non-transitory computer-readable storage medium of claim 22, wherein the instructions when executed by the processor further cause the processor to perform an action responsive to the sound event identification data.

25. The non-transitory computer-readable storage medium of claim 22, wherein the merger adapter generates the sound event identification data based on merged output based on element-by-element merger of the third output and the second output.

26. A device comprising:
means for generating a first output based on audio data samples, the first output corresponding to a first count of classes of a first set of sound classes, the audio data samples including a first audio data sample;
means for generating a second output based on the audio data samples, the second output corresponding to a second count of classes of a second set of sound classes, the second count of classes greater than the first count of classes, the first output and the second output generated based on the first audio data sample;

means for generating a third output based on the first output, the third output corresponding to the second count of classes of the second set of sound classes; and
means for generating sound event identification data based on the third output and the second output.

27. The device of claim 26, wherein the means for generating the third output based on the first output comprises an input layer including a first count of nodes and an output layer including a second count of nodes, and wherein the first count of nodes corresponds to the first count of classes of the first set of sound classes, and the second count of nodes corresponds to the second count of classes of the second set of sound classes.

28. The device of claim 26, wherein the means for generating the sound event identification data based on the third output and the second output is configured to merge the second output and the third output, element-by-element, to form a merged output.

29. The device of claim 26, wherein the means for generating the sound event identification data based on the third output and the second output is configured to generate output data including the sound event identification data based on a merged output formed from the third output and the second output.

30. The device of claim 26, further comprising means for capturing audio data, wherein the audio data samples include features extracted from the audio data.

* * * * *